United States Patent [19]

Kitazawa

[11] Patent Number: 5,727,244
[45] Date of Patent: Mar. 10, 1998

[54] MOTOR-DRIVEN CAMERA

[75] Inventor: Toshiyuki Kitazawa, Tokyo, Japan

[73] Assignee: Asahi Kogaku Kogyo Kabushiki Kaisha, Tokyo, Japan

[21] Appl. No.: 684,036

[22] Filed: Jul. 19, 1996

[30] Foreign Application Priority Data

Jul. 20, 1995 [JP] Japan ................ 7-184125

[51] Int. Cl.$^6$ .................... G03B 1/18; G03B 19/10
[52] U.S. Cl. .................... 396/411; 396/418; 396/512; 396/513
[58] Field of Search .................... 396/411, 418, 396/511, 512, 513, 516, 518

[56] References Cited

U.S. PATENT DOCUMENTS

| | | | |
|---|---|---|---|
| 4,855,772 | 8/1989 | Hashimoto et al. | 396/410 |
| 4,881,092 | 11/1989 | Fukahori et al. | 396/357 |
| 4,954,859 | 9/1990 | Kitizawa | 396/397 |
| 5,001,505 | 3/1991 | Tosaka et al. | 396/418 |
| 5,122,820 | 6/1992 | Pagano et al. | 396/207 |
| 5,136,314 | 8/1992 | Kazami et al. | 396/406 |
| 5,220,371 | 6/1993 | Tanii et al. | 396/512 |
| 5,235,365 | 8/1993 | Takatori et al. | 396/406 |
| 5,274,407 | 12/1993 | Haraguchi et al. | 396/406 |
| 5,296,887 | 3/1994 | Zander | 396/207 |
| 5,548,359 | 8/1996 | Wakabayashi | 396/516 |
| 5,592,253 | 1/1997 | Nishimura et al. | 396/538 |
| 5,612,760 | 3/1997 | Okuno | 396/513 |
| 5,630,192 | 5/1997 | Kobayashi | 396/513 |

Primary Examiner—Safet Metjahic
Assistant Examiner—Eddie C. Lee
Attorney, Agent, or Firm—Greenblum & Bernstein, P.L.C.

[57] ABSTRACT

A camera uses a film cartridge having a casing with a spool therein, and a slot formed in the casing. A film is drawn from, and returned into, the casing through the slot. A light-intercepting door is provided along the slot for opening and closing the slot, and a pivotal shaft rotatably mounts the light-intercepting door on the casing. The camera includes first and second motors. The first motor rotates the pivotal shaft to open and close the door, rotates the spool in one direction to advance the film wound on the spool from the film cartridge, and rotates the spool in another direction to rewind the film into the film cartridge. The second motor rotates a film take-up spool provided in the camera to wind the film around the film take-up spool.

9 Claims, 18 Drawing Sheets 5,727,244

1

MOTOR-DRIVEN CAMERA

BACKGROUND OF THE INVENTION

1. Field of the Invention

The present invention relates to a motor-driven camera in which film winding/rewinding operations and other operations are efficiently and effectively carried out by two motors provided in the camera.

2. Description of Related Art

In a conventional film cartridge used in cameras, a small portion of a film leader or tongue is placed outside of the film cartridge in advance, to be manually drawn out and engaged with a film take-up spool provided in the camera when the film cartridge is loaded. However, in a recently proposed new type of film cartridge, all the film, including the film leader, is housed inside the cartridge before use (in an unexposed state). When in use, a slot, which is formed on the cartridge and closed by a light-intercepting door when not in use, is opened by opening the light-intercepting door, the film leader emerges from the slot by a rotation of a spool inside the film cartridge. Such a new type of film cartridge is disclosed, for example, in U.S. Pat. No. 5,122,820 or U.S. Pat. No. 5,296,887.

In a camera using such a new type of film cartridge, when the film cartridge is inserted into a film chamber of the camera, one end of a pivotal shaft of the light-intercepting door is engaged with a door opening/closing key provided in the film chamber. Thereafter, when a film chamber lid, is manually closed and subsequently locked, the door opening/closing key rotates through the pivotal shaft, in a predetermined rotational direction to open the light-intercepting door. When the film cartridge loaded in the camera is taken out of the film chamber, e.g., after all the frames of the film housed in the film chamber have been exposed, the film chamber lid is firstly manually unlocked before being opened. The door opening/closing key rotates, in the opposite rotational direction to close the light-intercepting door.

In a conventional camera having such a structure as noted above, if the film chamber lid is mistakenly unlocked and opened before all the film has been rewound back into the film cartridge, that is, in a state where some film still remains in the camera outside the film cartridge, part or all, of the film will be exposed to ambient light, exposing part or all of the pictures taken. Moreover, in the above case, since the light-intercepting door is closed while some film remains outside the film cartridge, the film will be jammed between the light-intercepting door and the slot, damaging the film and the light-intercepting door.

In order to prevent such a problem from occurring, a variety of mechanisms have been proposed. However, most of these mechanisms are complicated, space-consuming and costly. Specifically, in the case where such a conventional mechanism is provided in an SLR camera in which film winding/rewinding operations, a shutter charging operation, quick-return mirror up/down operations, etc., are performed by a plurality of motors, the internal structure of such a camera and the control thereof become quite complicated, making the camera large and bulky.

SUMMARY OF THE INVENTION

The primary object of the present invention is to provide a motor-driven camera provided with a simple and space-efficient mechanism for preventing a film from being mistakenly exposed to ambient light. Another object of the present invention is to provide a motor-driven camera which

2 prevents the film or the light-intercepting door from getting damaged due to a careless opening of the light-intercepting door before all the film has been rewound back into the film cartridge.

To achieve the objects mentioned above, according to an aspect of the present invention, there is provided a camera which uses a film cartridge having a casing with a spool therein, and a slot formed on the casing. A film is drawn from or returned into the casing through the slot. A light-intercepting door is provided along the slot for opening or closing the slot. A pivotal shaft mounts the light-intercepting door rotatably on the casing. The camera includes a first motor and a second motor. The first motor opens and closes the door by rotating the pivotal shaft in one direction and another direction, respectively. The first motor rotates the spool in one direction to advance the film wound on the spool from the film cartridge. The first motor rotates the spool in another direction to rewind the film into the film cartridge. The second motor rotates a film take-up spool provided in the camera to wind the film around the film take-up spool.

With this arrangement, opening and closing of the door, film advancement and rewind are all performed in the camera, are allocated to only two motors, i.e., the first and second motors. This produces a small and compact camera.

Preferably, the first motor opens the door or rewinds the film by rotating a rotating shaft of the first motor in a first direction. The first motor closes the door or advances the film by rotating the rotating shaft of the first motor in a second direction.

The film cartridge may further include a rotational member which rotates together with the spool, the rotational member being provided with a bar code. In this case, the first motor preferably further performs a rotating member driving operation, in which the first motor rotates the rotational member by rotating the spool so as to read information from the bar code.

In another aspect of the present invention, an SLR camera is provided which uses a film cartridge having a casing with a spool therein; and a slot formed on the casing. A film is drawn from or returned into the casing through the slot. A light-intercepting door is provided along the slot for opening or closing the slot. A pivotal shaft mounts the light-intercepting door rotatably on the casing. The camera includes a first motor and a second motor. The first motor opens and closes the light-intercepting door by rotating the pivotal shaft. The first motor rotates the spool in one direction to advance the film wound on the spool from the film cartridge. The first motor rotates the spool in another direction to rewind the film into the film cartridge. The second motor rotates a film take-up spool, provided in the camera, to wind the film around the film take-up spool. The second motor also performs a shutter charging operation, in which a shutter charge is performed; a mirror up operation, in which a quick-return mirror provided in the SLR camera is moved up after a shutter release, and a mirror down operation, in which the quick-return mirror is moved down after the mirror up operation is completed.

The present disclosure relates to subject matter contained in Japanese Patent Application No. 7-184125 (filed on Jul. 20, 1995) which is expressly incorporated herein by reference in its entirety.

BRIEF DESCRIPTION OF THE DRAWINGS

The invention will be described below in detail with reference to the accompanying drawings in which like reference numerals indicate like members, and wherein.

DESCRIPTION OF THE PREFERRED EMBODIMENT

Figure 7:
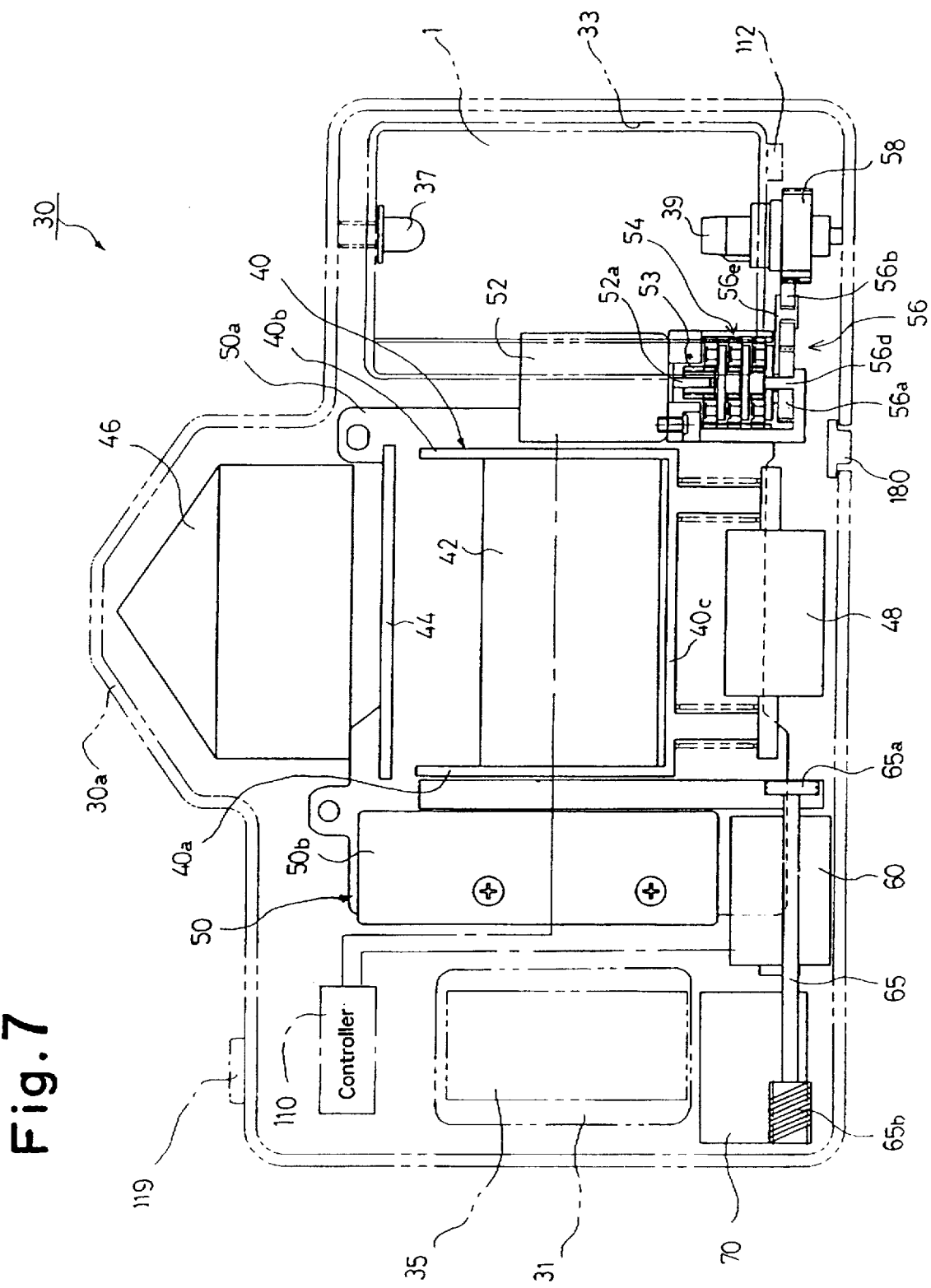
FIG. 7 is a front elevational view showing an internal structure of a motor-driven SLR camera to which the present invention is applied.
Figure 10:
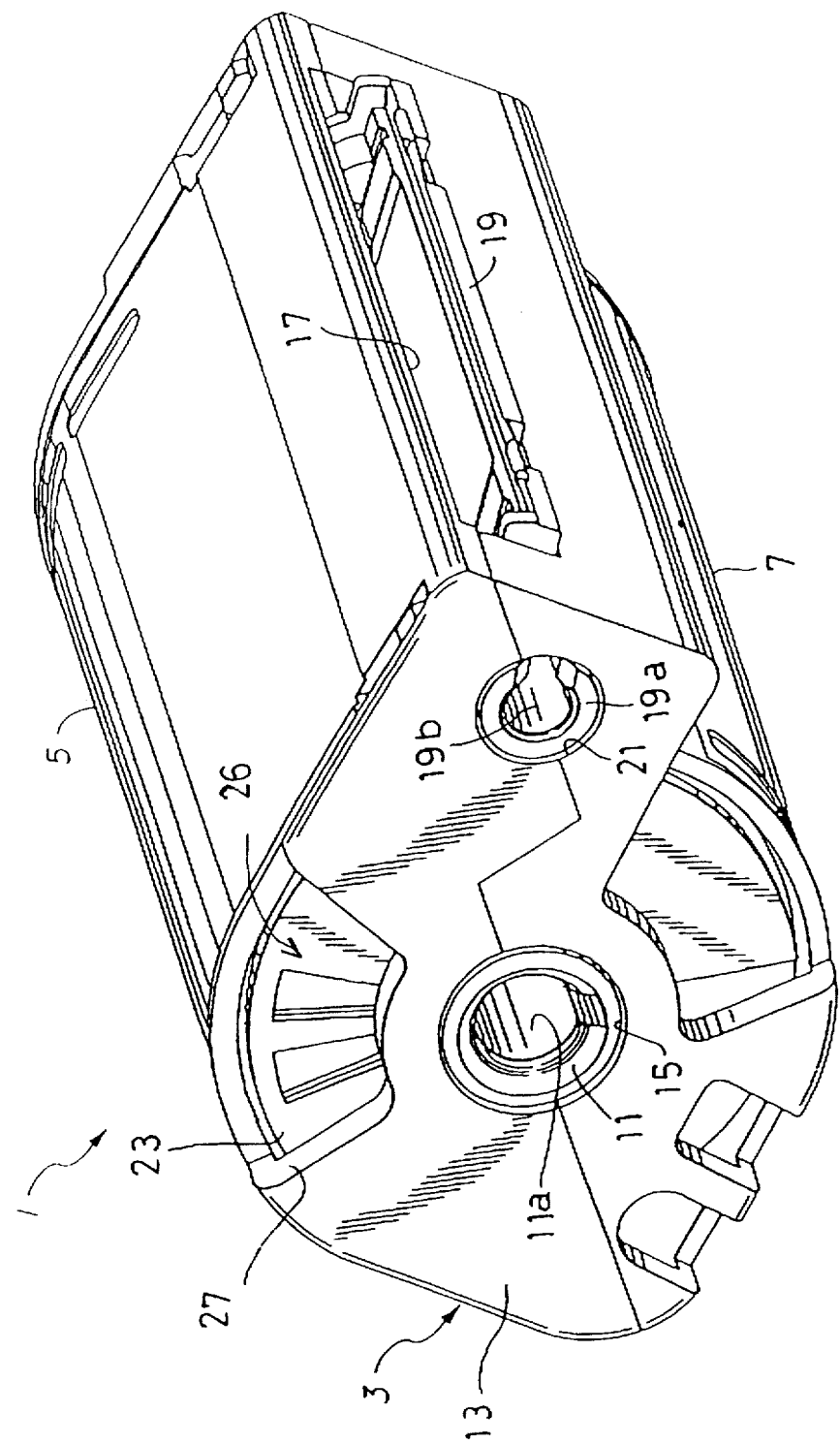
FIG. 10 is a perspective view of a film cartridge for use in the camera shown in FIG. 7.
Figure 11:
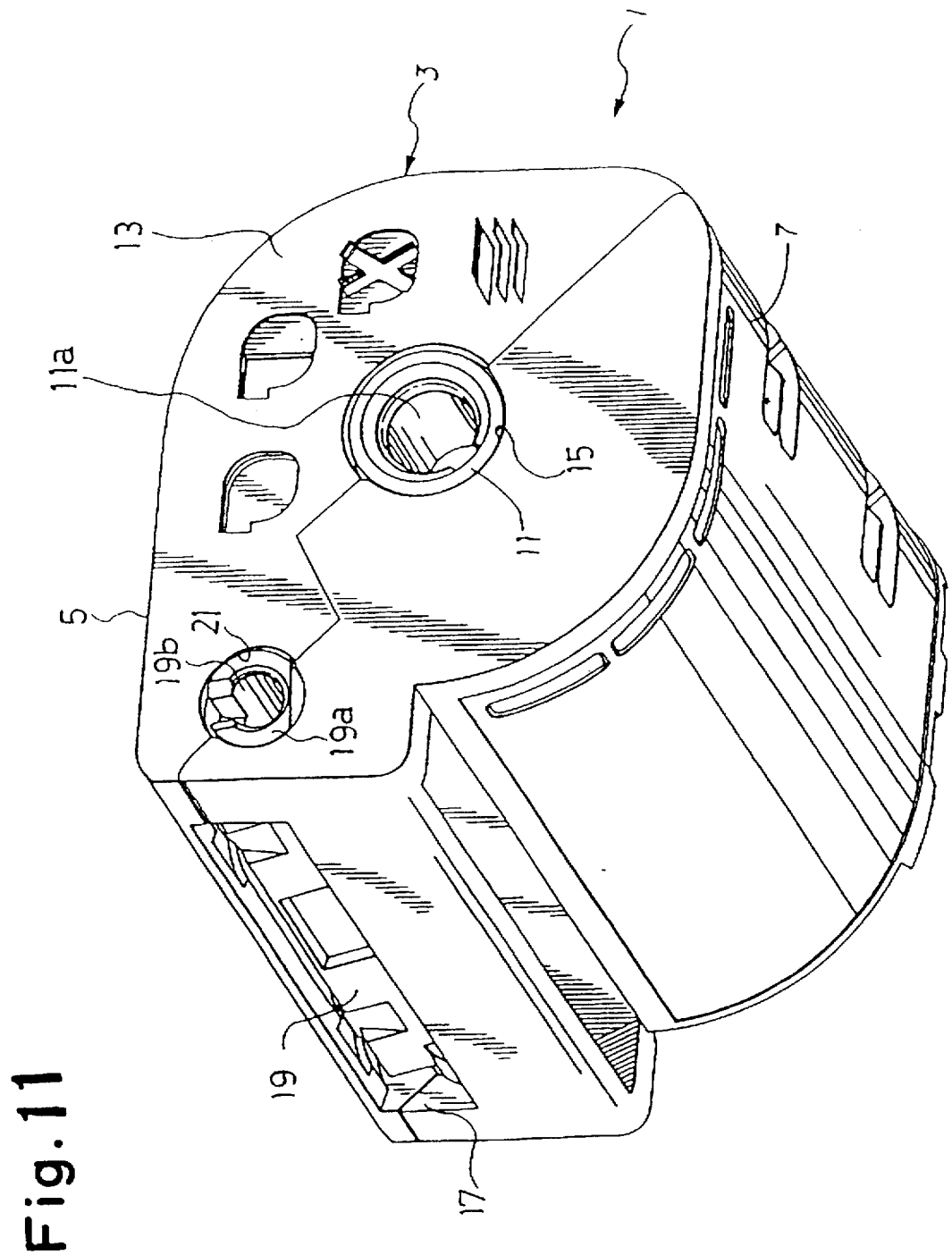
FIG. 11 is another perspective view of the film cartridge shown in FIG. 10.

An SLR camera 30 shown in FIG. 7 to which the present invention is applied, uses a specific type of film cartridge disclosed in, for example, U.S. Pat. No. 5,122,820 or U.S. Pat. No. 5,296,887. Such a type of film cartridge will be discussed first hereinafter with reference to FIGS. 10, 11 and 12.

A film cartridge 1 has a casing 3 consisting of two casing members 5 and 7. In the casing 3 a spool 11 (shown in detail in FIG. 12) is accommodated on which a film (not shown) is rolled. The spool 11 is provided at each end thereof with an engaging hole 11a. The casing 3 is provided on each end plate 13 thereof with an opening 15, to expose the corresponding engaging hole 11a outside the casing 3.

The casing 3 is also provided, along a longitudinal direction thereof, with a rectangular slot 17. The slot 17 is opened or closed by a light-intercepting door 19 provided along the slot 17. The door 19 is provided at each end thereof with a pivotal portion (i.e., pivotal shaft) 19a along a common axis. Each pivotal portion 19a is rotatably engaged with a corresponding bearing hole 21 formed on the corresponding end plate 13; the door 19 opens and closes by rotating about the pivotal portions 19a.

A keyhole 19b is formed on each pivotal portion 19a. One of the keyholes 19b is engaged with a door opening/closing key (not shown) of a commonly-known cartridge door drive mechanism (not shown) provided in a camera when the cartridge 1 is inserted into the camera. The door 19 is opened or closed when the film, housed in the film cartridge 1, is drawn from or returned to the slot 17 by a rotation of the spool 11 while the slot 17 is kept open.

Figure 12:
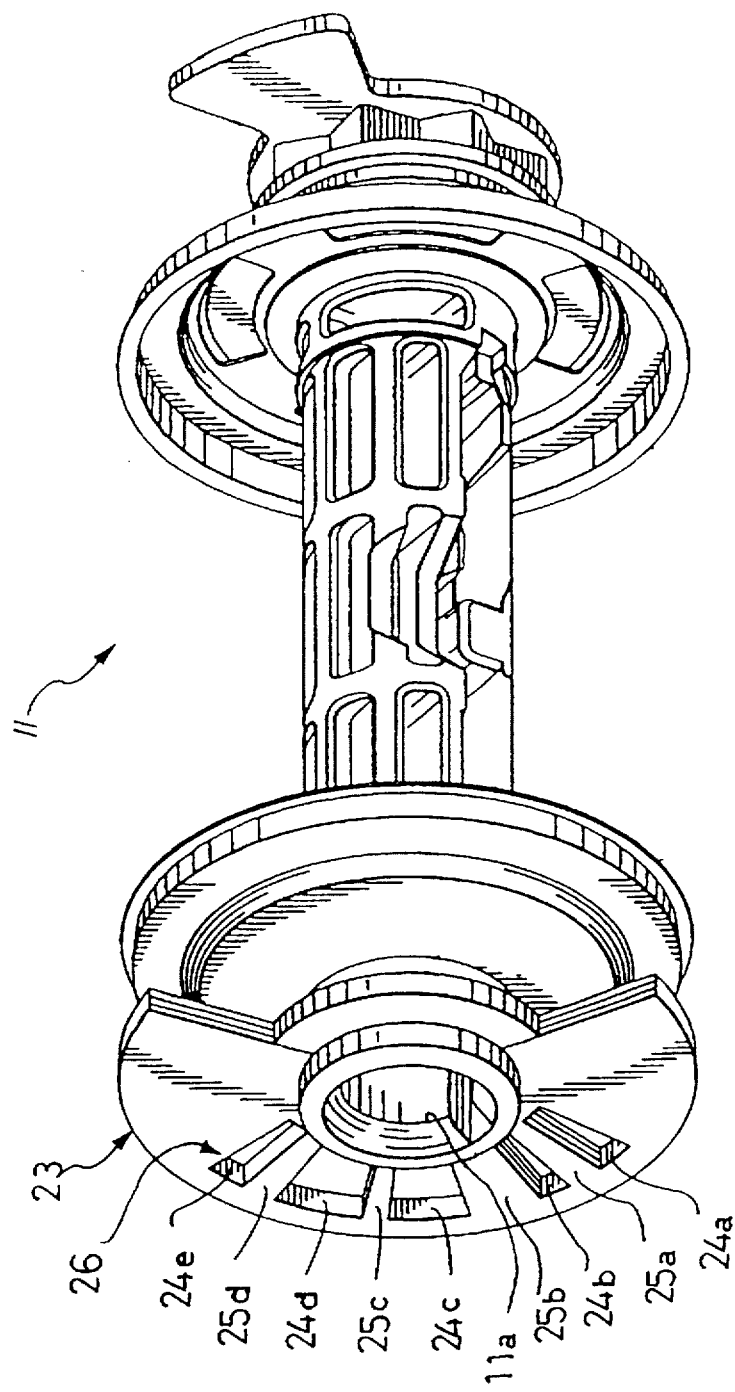
FIG. 12 is a perspective view of a spool provided in the film cartridge shown in FIG. 10 or 11.

As shown in FIG. 12, a partial disc member 23 is provided between one of the ends of the spool 11 and the corresponding end plate 13 of the casing 3. The partial disc member 23 is fitted so not to rotate with respect to the spool 11, i.e., the partial disc member 23 rotates together with the spool 11 when the spool 11 rotates.

The partial disc member 23 is provided with a predetermined bar code 26 consisting of slits 24a, 24b, 24c, 24d and 24e, each having a predetermined width, and non-slit portions 25a, 25b, 25c and 25d, each being positioned between two adjacent slits and having a predetermined width. Each slit or non-slit portion extends in a radial direction from a central axis of the spool 11. The bar code 26 contains information about the film cartridge 1 regarding the film ISO speed, the number of exposures, etc. The bar code 26 is exposed to the outside of the film cartridge 1 through an opening 27 formed on the corresponding end plate 13 of the casing 3.

Details regarding the camera 30 will be hereinafter described with reference to FIG. 7.

A spool chamber 31 and a film chamber 33 are respectively formed in the left and right-hand sides of the camera 30, as viewed in FIG. 7. A film take-up spool 35 is rotatably supported in the spool chamber 31. A film chamber lid (not shown) for opening or closing the film chamber 33 is pivotally supported towards the rear (or on the bottom) of the camera 30.

The camera 30 adopts a prewind control in which all the film housed in the film cartridge 1 is wound by a rotation of the film take-up spool 35 in advance, immediately after the film cartridge 1 is loaded in the film chamber 33. Each time a picture is taken, the film is rewound back into the film cartridge 1 by an amount corresponding to one picture frame. The film in the film cartridge 1 is wound by rotation of the film take-up spool 35 immediately after the above-noted film chamber lid, for opening or closing the film chamber 33, is closed and locked, after an unexposed film cartridge 1 has been loaded in the film chamber 33.

In the film chamber 33, a supporting projection 37, extending downwards, and a spool drive fork 39, extending upwards, are provided along a common axis on the upper and lower ends of the film chamber 33, respectively, as viewed in FIG. 7. The supporting projection 37 and the spool drive folk 39 respectively engage with the corresponding engaging hole 11a when the film cartridge 1 is loaded in the film chamber 33. The spool 11 rotates when the spool drive fork 39 rotates. The supporting projection 37 supports the spool 11 in a rotatable fashion as a rotational center.

At the bottom of the film chamber 33, a photosensor 112 for reading the information of the bar code 26 is fixed opposite the opening 27 of the film cartridge 1, when the film cartridge 1 is loaded in the film chamber 33.

The aforementioned door opening/closing key for opening or closing the light-intercepting door 19 is also provided at the bottom of the film chamber 33. The door opening/closing key is not shown in FIG. 7. The door opening/closing key projects upwards from the bottom of the film chamber 33. When the film cartridge 1 is inserted properly into the film chamber 33, a predetermined end of the pivotal portion 19a of the light-intercepting door 19 is engaged with the door opening/closing key. In this state of engagement, rotation of the door opening/closing key in a predetermined rotational direction opens the light-intercepting door 19 through the pivotal portion 19a.

A mirror box 40 is fixed to the camera body 30a between the spool chamber 31 and the film chamber 33. The mirror box 40 consists of left and right walls 40a, 40b and a bottom plate 40c which connects the lower ends of the left and right walls 40a, 40b. The mirror box 40 is provided with a quick-return mirror 42, usually located at a lower position when a picture is not being taken but is moved up to an upper position when a picture is taken. A pentaprism 46 is fixed to the camera body 30a, above the quick-return mirror 42. A focusing screen 44 is fixed between the pentaprism 46 and the quick-return mirror 42. Below the mirror box 40 an AF sensor module 48 is provided. The AF sensor module 48 has a pair of image forming lenses and a multi-segment CCD sensor (both not shown). Part of the center of the image projected beneath the quick-return mirror 42 towards the AF sensor module 48 is split into two through the aforementioned pair of image forming lenses. The two split images are subsequently projected onto the aforementioned multi-segment CCD sensor. The multi-segment CCD sensor phase-detects the relative locations of the two images to calculate a lens focusing movement necessary for a sharp image.

An electronically controlled focal-plane shutter unit 50 is fixed between the spool chamber 31 and the film chamber 33. The shutter unit 50 consists of a shutter block 50a placed behind the mirror box 40 and a shutter blade driver 50b placed between the spool chamber 31 and the mirror box 40. The shutter block 50a has a plurality of shutter blades (not shown) which are driven by the shutter blade driver 50b.

A pressure plate (not shown) is provided behind the shutter block 50a. The pressure plate extends parallel to the shutter block 50a. An aperture frame (not shown) is fixed to the camera body 30a immediately behind the shutter block 50a. The aperture frame is provided on a center thereof with a rectangular-shaped photographic aperture which forms the boundaries of each frame exposed. The aperture frame is further provided, on upper and lower sides relative to the photographing aperture, with film guiding rails, each extending in a horizontal direction (horizontal direction of FIG. 7) of the camera 30. The aforementioned pressure plate is placed immediately behind the aperture frame. A pair of photoreflectors 55a (FIG. 9) are fixed to the pressure plate. The pair of photoreflectors 55a detect perforations (not shown) provided on the film to detect the state of the film (i.e., whether or not the film is moving), and the amount of winding of the film.

A first motor 52 having a rotating shaft 52a is fixed to the camera body 30a between the mirror box 40 and the film chamber 33. The rotating shaft 52a of the first motor 52 extends along a vertical direction (vertical direction of FIG. 7) of the camera 30, that is, along a direction perpendicular to a film moving direction (horizontal direction in FIG. 7).

Figure 1:
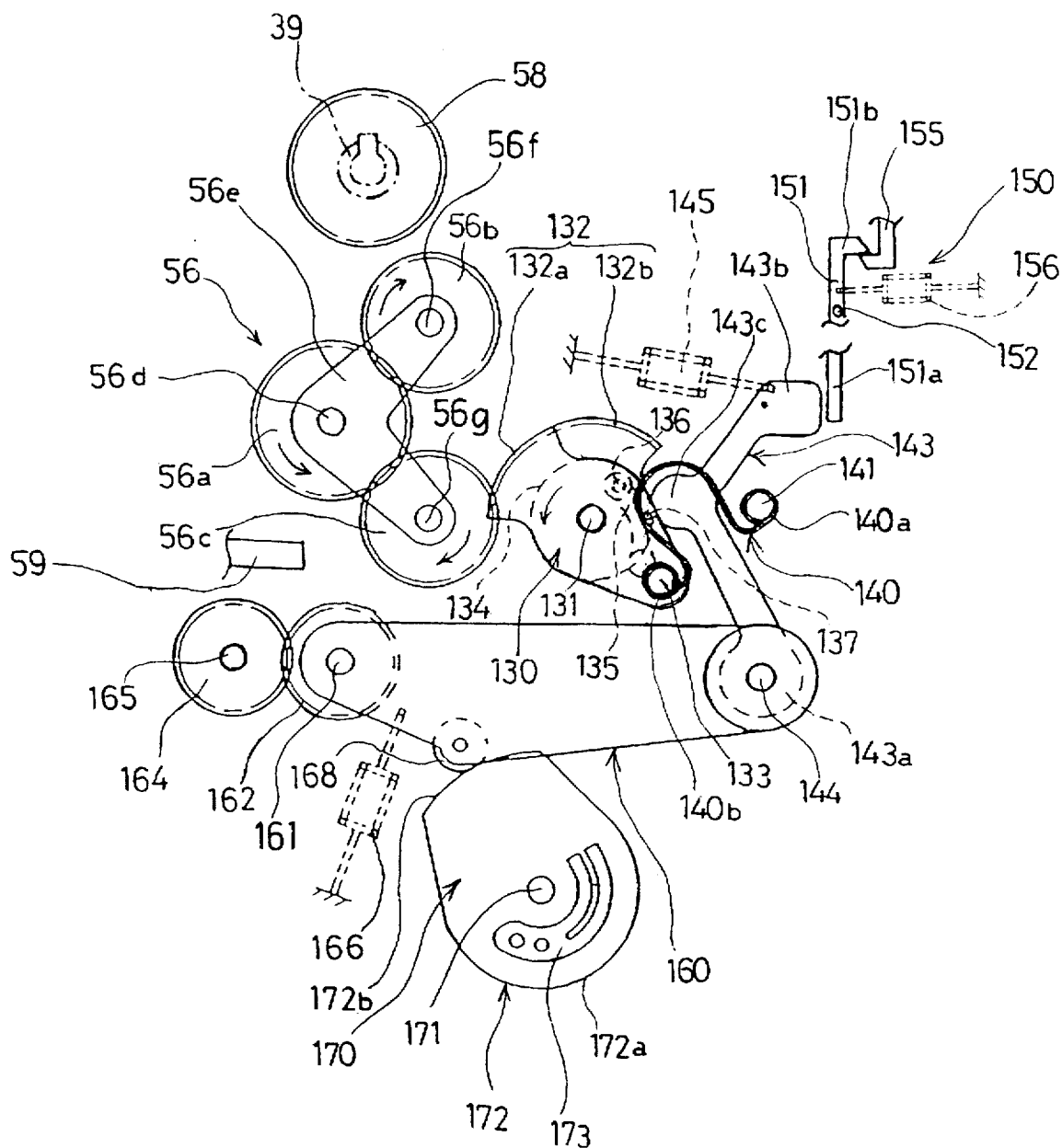
FIGS. 1 through 6 are plan views of an important part of a camera in different states, to which the present invention is applied.

The first motor 52 is responsible for the following five operations:

(1) a light-intercepting door opening operation, in which the first motor 52 drives the aforementioned door opening/closing key to rotate in a predetermined rotational direction to open the light-intercepting door 19. This operation occurs immediately after the film chamber lid is closed and locked, an unexposed film cartridge 1 has been loaded in the film chamber 33 and the film chamber lid is closed and locked;

(2) a partial disc member driving operation, in which the first motor 52 drives the spool drive fork 39 to rotate in a forward rotational direction (the counterclockwise direction in FIG. 1) by a predetermined rotation amount (e.g., one to two rotations), at the same time that the above light-intercepting door opening operation is performed. This rotate the partial disc member 23 in the same rotational direction by the same predetermined amount of rotation to read out the information of the bar code 26, formed on the partial disc member 23, through the photosensor 112;

(3) a film advancing operation, performed after the aforementioned partial disc member driving operation, in which the first motor 52 drives the spool drive fork 39 to rotate in a backward (reverse) rotational direction (the clockwise direction in FIG. 1). This draws the film out of the film cartridge 1 through the slot 17 and delivers the film leader of the film to the spool chamber 31;

(4) a film rewinding operation, in which the first motor 52 drives the spool drive fork 39 to rotate in the forward rotational direction immediately after one picture frame is exposed. This accommodates the exposed frame in the film cartridge 1 after each exposure; and (5) a light-intercepting door closing operation, in which the first motor 52 drives the aforementioned door opening/closing key to rotate in the other rotational direction to close the light-intercepting door 19, after all the film is rewound in the film cartridge 1 by the above-noted film rewinding operation.

As shown in FIG. 7, a second motor 60 having a rotating shaft 60a (FIG. 8) is fixed to the camera body 30a at a position below the lower end of the shutter blade driver 50b. The rotating shaft 60a of the second motor 60 extends along the horizontal direction (horizontal direction of FIG. 7) of the camera 30, that is, along the film moving direction.

The second motor 60 is responsible for the following three operations:

(1) a film winding operation, in which the second motor 60 drives the film take-up spool 31 to rotate to wind the film thereon;

(2) a shutter charging operation, for charging the shutter unit 50; and (3) a mirror up/down operation, for moving the quick return mirror 42 up and down.

The rotation transmitting mechanisms of the first and second motors 52, 60 will be hereinafter discussed.

The rotation transmitting mechanism of the first motor 52 will be discussed first with reference to FIG. 7.

Rotation of the rotating shaft 52a is transmitted to a sun gear 56a of a planetary gear 56 through an output pinion 53, fixed to the rotating shaft 52a, and a reduction gear train 54 provided immediately below the first motor 52. The planetary gear 56 includes the sun gear 56a and first and second planet gears 56b, 56c both engaging with the sun gear 56a. The planetary gear 56 further includes an L-shaped arm member 56e pivoted at a rotational shaft 56d of the sun gear 56a, as shown in FIG. 1. The first and second planet gears 56b, 56c are pivoted at respective rotational shafts 56f, 56g fixed on respective free ends of the arm member 56e. The first and second planet gears 56b and 56c are positioned at different positions in the vertical direction (direction perpendicular to the sheet of FIG. 1) of the camera 30. More specifically, the first planet gear 56b is positioned slightly above the second planet gear 56c by a predetermined amount in the vertical direction of the camera 30.

In the vicinity of the planetary gear 56, a stopper 59 is fixed to the camera body 30a to limit the rotation of the arm member 56e. That is, one free end of the arm member 56e which supports the second planet gear 56c abuts against the stopper 59 when the arm member 56e rotates in the clockwise direction in FIG. 1 to a predetermined position where the tip of the stopper 59 is located.

When the sun gear 56a rotates in the counterclockwise direction in FIG. 1 (due to forward rotation of the first motor 52), the first and second planet gears 56b, 56c revolve around the sun gear 56a in the counterclockwise direction while each (i.e., the first and second plant gears 56b, 56c) rotates in the clockwise direction.

A drive gear 58 is provided in the vicinity of the planetary gear 56 at a position to be engageable with the first planet gear 56b. The drive gear 58 rotates together with the spool drive fork 39. Rotation of the sun gear 56a in the counterclockwise direction in FIG. 1 brings the first planet gear 56b into engagement with the drive gear 58. In this state of engagement the drive gear 58 rotates in the counterclockwise direction due to the first planet gear 56b rotating in the clockwise direction.

When the sun gear 56a rotates in the clockwise direction in FIG. 1 (due to reverse rotation of the first motor 52), the first and second planet gears 56b, 56c revolve around the sun gear 56a in the clockwise direction while each (i.e., the first and second planet gears 56b, 56c) rotates in the counterclockwise direction.

A rotary drive member 130 having a predetermined shape, as shown in FIGS. 1 through 6, is provided in the vicinity of the planetary gear 56 at a position to be engageable with the first planet gear 56b or the second planet gear 56c. The rotary drive member 130 is fixed on a rotational shaft 131 rotatably supported by the camera body 30a. The aforementioned door opening/closing key is formed integral with the rotational shaft 131 along a common axis.

The rotary drive member 130 is provided on a peripheral edge thereof with a sector gear 132. The sector gear 132 consists of first and second gear portions 132a, 132b. The first and second gear portions 132a, 132b are successively formed along a peripheral (circumferential) edge of the rotary drive member 130. The first and second gear portions 132a, 132b are positioned at different locations along the vertical direction of the camera 30. More specifically, the second gear portion 132b is positioned above the first gear portion 132a by a predetermined amount in the vertical direction of the camera 30. Namely, the first and second gear portions 132a, 132b are not successively formed in the vertical direction of the camera 30, whereas the first and second gear portions 132a, 132b are successive along the circumferential direction of the rotary drive member 130. The first gear portion 132a and the second planet gear 56c are positioned at a common plane extending in the horizontal direction of the camera 30. The second gear portion 132b and the first planet gear 56b are positioned at a common plane extending in the horizontal direction of the camera 30. With this arrangement, the first gear portion 132a meshes with the second planet gear 56c but cannot mesh with the first planet gear 56b, similarly the second gear portion 132b meshes with the first planet gear 56b but cannot mesh with the second planet gear 56c.

A snap spring 140 having a substantially "Ω" (omega) shape, is connected to the rotary drive member 130. The snap spring 140 limits rotation of the rotary drive member 130. Each end of the snap spring 140 is formed in a ring shape. One end 140a of the snap spring 140 is fitted on a stationary pin 141 extending from the camera body 30a. The other end 140b of the snap spring 140 is fitted on a pin 133 formed integral with the rotary drive member 130 at a position opposite to the sector gear 132 with respect to the rotational shaft 131.

The rotary drive member 130 is further provided with a cylindrical surface 134. The cylindrical surface 134 has a center coincident with the axial center of the rotational shaft 131. An engaging projection 143c formed integral with a lock releasing lever 143 comes into contact with the cylindrical surface 134. The rotary drive member 130 is further provided with a rotational lever 135. One end of the rotational lever 135 is pivoted at an axial pin 136 fixed on the rotary drive member 130. The rotational lever 135 is rotatable about the axial pin 136. The rotational lever 135 is always biased by a torsion spring (not shown) in the counterclockwise direction in FIG. 1.

A projection 137 is formed on the rotary drive member 130. The projection 137 limits a further rotation of the rotational lever 135 in the counterclockwise direction from the position shown in FIG. 1. A free end of the rotational lever 135 is positioned outwardly from the cylindrical surface 134, so that the free end of the rotational lever 135 can come into contact with the engaging projection 143c.

The lock releasing lever 143 is provided in the vicinity of the rotary drive member 130. The lock releasing lever 143 unlocks a locking mechanism 150 for locking the aforementioned film chamber lid (not shown) to open or close the opening of the film chamber 33. One end 143a of the lock releasing lever 143 is pivoted at an axial pin 144 fixed on the camera body 30a. The lock releasing lever 143, the first motor 52, the planetary gear 56, the rotary drive member 130, the snap spring, etc., constitute a lock releasing mechanism.

One end of a coil spring 145 is connected to a free end 143b of the lock releasing lever 143, so that the lock releasing lever 143 is always biased by the coil spring 145 in the counterclockwise direction in FIG. 1. The other end of the coil spring 145 is fixed to the camera body 30a. The locking mechanism 150 consists of an engaging lever 151, a coil spring 156, a second engaging claw 155 formed integral with the film chamber lid, etc.

The lock releasing lever 143 is provided on its approximate center with the aforementioned engaging projection 143c formed integral therewith. The engaging projection 143c always comes into pressing contact with the cylindrical surface 134 due to the biasing force of the coil spring 145. One end 151a of the engaging lever 151 is positioned adjacent to the releasing lever 143b.

An approximate center of the engaging lever 151 is pivoted at an axial pin 152. The other end of the engaging lever 151 is formed integral with a first engaging claw 151b. The first engaging claw 151b is engageable with the second engaging claw 155 of the film chamber lid. The engagement of the first engaging claw 151b with the second engaging claw 155 prevents the film chamber lid from opening. The engaging lever 151 is biased by the coil spring 156 in the clockwise direction in FIG. 1. When a free end 143b of the lock releasing lever 143 contacts the end 151a of the engaging lever 151 and subsequently presses the same against the biasing force of the coil spring 156 in the right direction as viewed in FIG. 1, (i.e., the engaging lever 151 is rotated in the counterclockwise direction in FIG. 1), the first engaging claw 151b and the second engaging claw 155 disengage. The film chamber lid is always biased by a biasing member, such as a leaf spring (not shown), in a direction to open the film chamber lid. Therefore, once the first engaging claw 151b and the second engaging claw 155 disengage, the film chamber lid opens automatically due to the biasing force of the biasing member. The second engaging claw 155 moves upwards and downwards along the vertical direction in FIG. 1 when the film chamber lid is opened and closed, respectively.

A control lever 160 is provided in the vicinity of the rotary drive member 130. One end of the control lever 160 is pivoted at the axial pin 144 at which one end 143a of the lock releasing lever 143 is pivoted. The other end of the control lever 160 is provided with a rotational shaft 161. A relay gear 162 is rotatably fitted on the rotational shaft 161. The relay gear 162 can mesh with either the second planet gear 56c or a spool advancing gear 164, or with both the second planet gear 56c and the spool advancing gear 164 at the same time. The relay gear 162 is in mesh with the spool advancing gear 164 when the control lever 160 is located at the position shown in FIG. 1. The spool advancing gear 164 rotates about a rotational shaft 165 fixed on the camera body 30a. The spool advancing gear 164 is connected to the drive gear 58 through a gear train consisting of a plurality of gears (not shown). Through the gear train the drive gear 58 rotates in the clockwise direction in FIG. 1 due to a rotation of the spool advancing gear 164 in the counterclockwise direction in FIG. 1.

The control lever 160 is always biased by a coil spring 166 in the counterclockwise direction in FIG. 1. A control cam member 170 is further provided in the vicinity of the control lever 160. The control cam member 170 is rotatable about a rotational shaft 171 fixed on the camera body 30a. A pinion gear (not shown) is fixed on the rotational shaft 171. The pinion gear is connected to the drive gear 58 through a planetary gear (not shown), which consists of a sun gear and a planet gear, and a gear train (not shown) consisting of a plurality of gears. The control cam member 170 thus rotates in the clockwise direction in FIG. 1 only when the drive gear 58 rotates in the counterclockwise direction. Therefore, when the drive gear 58 rotates in the clockwise direction, the rotation of the drive gear 58 is not transmitted to the control cam member 170, and the control cam member 170 does not rotate.

The circumferential surface of the control cam member 170 is formed as a cam surface 172. The cam surface 172 includes an arc-shaped cam surface 172a and a drive cam surface 172b. The arc-shaped cam surface 172a is such that distances from any point on the surface 172a to the center of the rotational shaft 171 are equal. The drive cam surface 172b is such that the distance from the surface 172b to the center of the rotational shaft 171 is longer than that from the arc-shaped cam surface 172a to the center of the rotational shaft 171.

Figure 6:
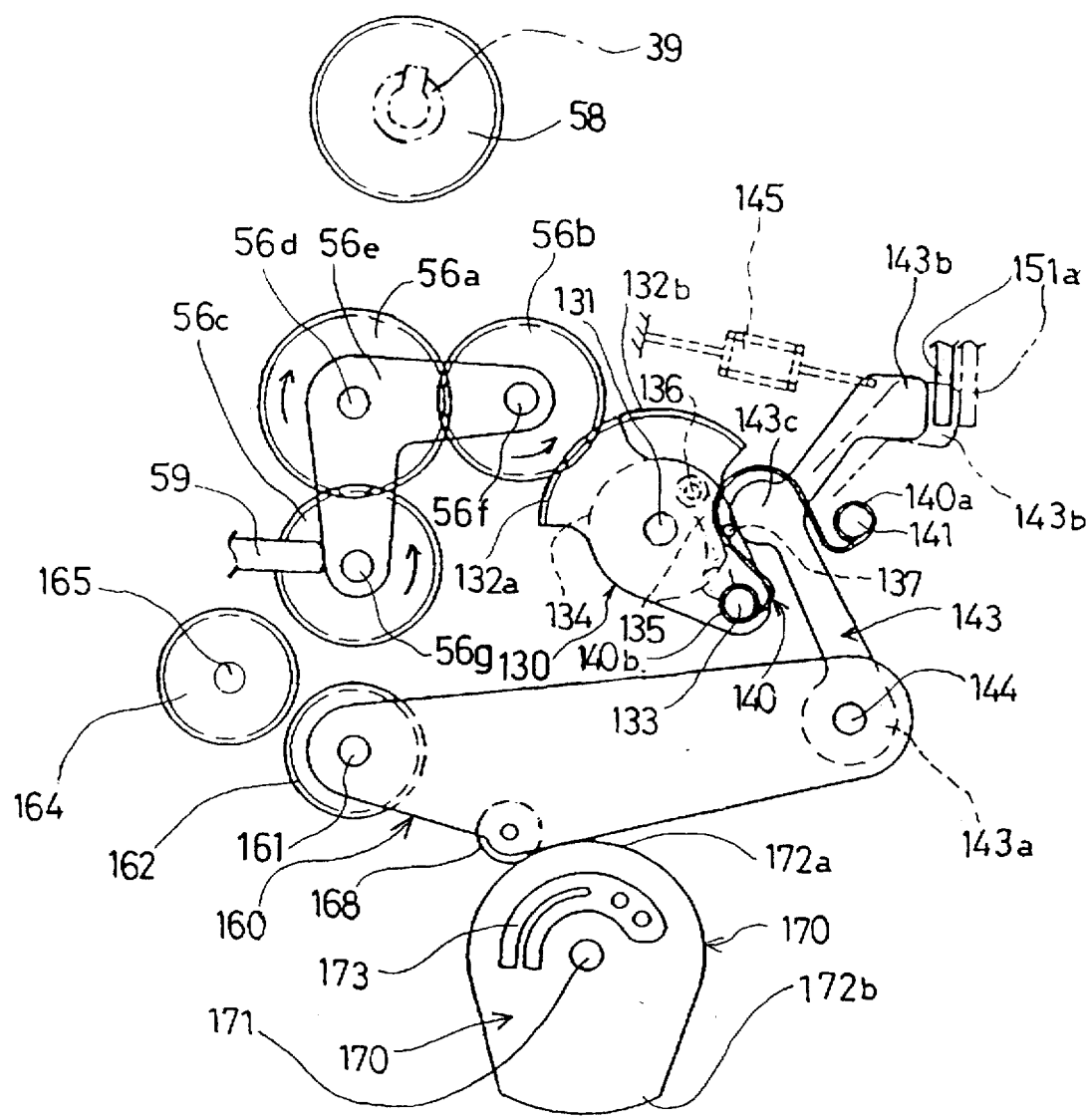

A roller 168 is rotatably supported on the control lever 160. The roller 168 always comes into pressing contact with the cam surface 172 due to the biasing force of the coil spring 166. When the roller 168 comes into pressing contact with the drive cam surface 172b, such as shown in FIG. 1, the control lever 160 is located at a first position where the relay gear 162 meshes with the spool advancing gear 164. When the roller 168 comes into pressing contact with the arc-shaped cam surface 172a, such as shown in FIG. 6, the control lever 160 is located at a second position where the relay gear 162 does not mesh with the spool advancing gear 164. Namely, the control lever 160 in the state shown in FIG. 1 shifts from the first position to the second position by rotating about the axial pin 144 by a predetermined amount in the counterclockwise direction. Therefore, if the control cam member 170 cycles from to rotate, the control lever 160 cycles from rotation in the clockwise direction and in the counterclockwise direction between the first and second positions, i.e. it continues to swing between the first and second positions.

The control cam member 170 is provided thereon with a curved electrical brush 173. The electrical brush 173 extends along a circumferential direction about the rotational shaft 171. The electrical brush 173 comes into sliding contact with a code plate having a predetermined code pattern (not shown) that is fixed opposite the electrical brush 173. With this arrangement, a rotational position or rotational angular position of the control cam member 170 is detected through the electrical brush 173. The code plate and the electrical brush 173 constitute a control cam member position detecting device 175 (shown in FIG. 9) for detecting a rotational position of the control cam member 170.

The rotation transmitting mechanism of the second motor 60 will now be discussed with reference to FIG. 8.

Rotation of the second motor 60 is transmitted to the film take-up spool 35 through a planetary gear 75, a shaft 65, a reduction gear train 70 (shown in FIG. 7), etc. A rotation of the second motor 60 is also transmitted to a shutter charging gear 90 and a mirror drive gear 100 through the planetary gear 75, a reduction gear train 80, etc. An output pinion 61 is fixed to the rotating shaft 60a of the second motor 60. A composite gear 71 is provided near to the output pinion 61. The composite gear 71 consists of a large gear 71a and a small gear 71b. The large and small gears 71a, 71b are coaxially formed integral with each other. The output pinion 61 meshes with the large gear 71a of the composite gear 71.

The planetary gear 75 consists of a sun gear 75a and a planet gear 75b. The planet gear 75b meshes with the sun gear 75a. The sun gear 75a has a rotational shaft 75c, serving as a rotational axis, and meshes with the small gear 71b of the composite gear 71. One end of a rotational arm 75d is pivoted at the rotational shaft 75c. The planet gear 75b is rotatably provided on the other end of the rotational arm 75d. The rotational arm 75d rotates within a limited range between stoppers 76a, 76b, each of which is fixed on the camera body 30a, i.e., between a first position and a second position, indicated by a solid line and a phantom line in FIG. 8, respectively.

Figure 8:
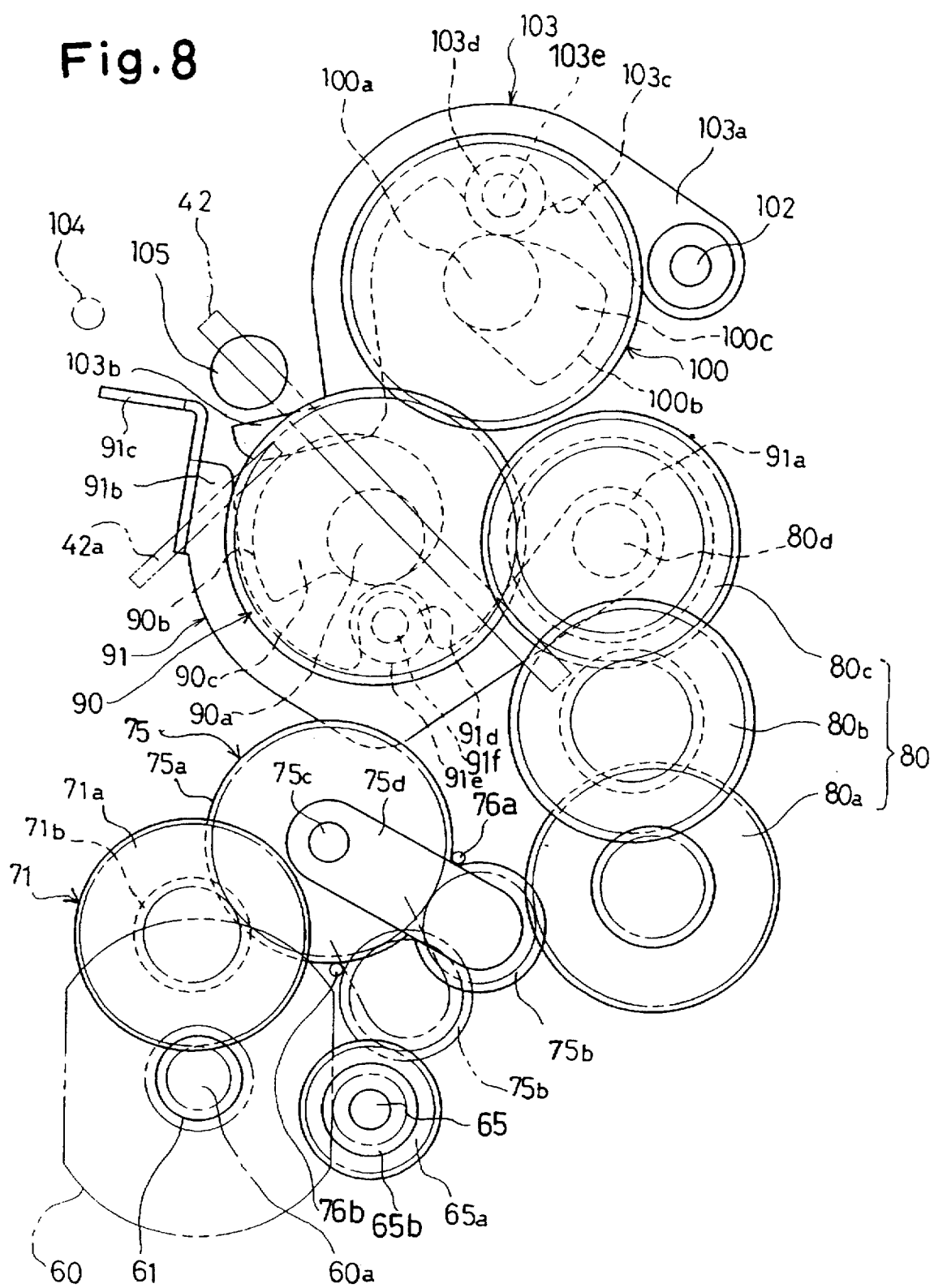
FIG. 8 is a plan view of a shutter charging mechanism and a mirror drive mechanism of the camera shown in FIG. 7.

The reduction gear train 80 is provided in front of the planetary gear 75 (on the right side of the planetary gear 75 in FIG. 8). The reduction gear train 80 consists of first, second and third gears 80a, 80b and 80c, respectively. The third gear 80c meshes with the shutter charging gear 90. The shutter charging gear 90 meshes with the mirror drive gear 100. The shutter charging gear 90 is rotatably fitted on a rotational shaft 90a which serves as a rotational axis. The rotational shaft 90a extends parallel to the horizontal direction of the camera 30.

The third gear 80c is fitted on a rotational shaft 80d on which one end 91a of a shutter charging lever 91 is pivoted. The shutter charging lever 91 has a curved shape. An engaging projection 91c is formed integrally with another end (free end) 9b of the shutter charging lever 91. The engaging projection 91c is engageable with a shutter-charge engaging portion (not shown) of the shutter blade driver 50b for a shutter charge.

A projection 91d is formed integrally with the shutter charging lever 91. The projection 91d extends in the direction of the rotational shaft 90a. An axial pin 91f is fixed on the projection 91d. The axial pin 91f extends parallel to the rotational shaft 80d. A roller 91e is rotatably fitted on the axial pin 91f. The shutter charging lever 91 is always biased in the clockwise direction, as viewed in FIG. 8, by a biasing member (not shown), such as a coil or torsion spring or the like.

The shutter charging gear 90 is provided with a charging cam 90c formed integrally thereon. The charging cam 90c has a cam surface 90b along its peripheral edge. The cam surface 90b comes into contact with the roller 91e. In the state shown in FIG. 8, the rotation of the shutter charging gear 90 in the clockwise direction pushes the roller 91e downwards by the cam surface 90b against the biasing force of the aforementioned biasing member that biases the shutter charging lever 91, thereby rotating the shutter charging lever 91 in the counterclockwise direction in FIG. 8.

In the vicinity of the mirror drive gear 100, a mirror drive lever 103, having a curved shape, is provided. The mirror drive gear 100 is rotatably fitted on a rotational shaft 100a extending parallel to the rotational shaft 90a. One end 103a of the mirror drive lever 103 is pivoted at a rotational shaft 102. The rotational shaft 102 extends parallel to the rotational shaft 100a. An engaging projection 103b is formed integrally with the other end (free end) of the mirror drive lever 103. The engaging projection 103b is engageable with a mirror pin 105. The mirror pin 105 is formed on the quick-return mirror 42. The quick-return mirror 42 is pivoted at a shaft 104. The shaft 104 extends in the horizontal direction of the camera 30. A projection 103c is formed integrally with the mirror drive lever 103. The projection 103c extends in the direction of the rotational shaft 100a. An axial pin 103e, extending parallel to the rotational shaft 102, is fixed on the projection 103c. A roller 103d is rotatably fitted on the axial pin 103e. The mirror drive lever 103 is always biased in the counterclockwise direction in FIG. 8 by a biasing member (not shown), such as a coil or torsion spring or the like.

The mirror drive gear 100 is provided with a mirror drive cam 100c formed integrally thereon. The mirror drive cam 100c has a cam surface 100b along its peripheral edge. The cam surface 100b comes into contact with the roller 103d. In the state shown in FIG. 8, rotation of the mirror drive gear 100 in the counterclockwise direction in FIG. 8 makes the roller 103d pushed upwards by the cam surface 100b against the biasing force of the aforementioned biasing member that biases the mirror drive lever 103, to thereby rotate the mirror drive lever 103 in the clockwise direction in FIG. 8.

The shaft 65, extending in the horizontal direction of the camera 30, is rotatably supported in the vicinity of the second motor 60. A pinion 65a is fixed on one end of the shaft 65. The pinion 65a is engageable with the planet gear 75b. A worm 65b is fixed on the other end of the shaft 65. The reduction gear train 70 is provided in the vicinity of the worm 65b. A rotation of the worm 65b is transmitted, via the reduction gear train 70, to a spool gear (not shown). The spool gear (not shown) is formed integrally with the film take-up spool 35 at the lower end thereof. The spool gear rotates together with the film take-up spool 35.

When the rotational arm 75d is in its first position, the planet gear 75b is engaged with the first gear 80a of the reduction gear train 80. While when the rotational arm 75d is in its second position, the planet gear 75b is engaged with the pinion 65a.

Due to the rotation transmitting mechanism of the second motor 60, when the second motor 60 rotates in the reverse direction (i.e., the counterclockwise direction in FIG. 8), the composite gear 71 rotates in the clockwise direction to thereby rotate the sun gear 75a in the counterclockwise direction, as viewed in FIG. 8. Due to this rotation of the sun gear 75a, the rotational arm 75d rotates in the counterclockwise direction to reach its first position, so that the planet gear 75b, rotating in the clockwise direction, is brought into mesh with the first gear 80a. Rotation of the planet gear 75b in the clockwise direction is transmitted to the shutter charging gear 90 and the mirror drive gear 100, via the reduction gear train 80. The shutter charging gear 90 is rotated in the clockwise direction, so that the shutter charging lever 91 is rotated in the counterclockwise direction to perform a shutter charge. At the same time, the mirror drive gear 100 is rotated in the counterclockwise direction by the rotation of the shutter charging gear 90, so that the mirror drive lever 103 is rotated in the clockwise direction. Due to this rotation of the mirror drive lever 103 in the clockwise direction, the engaging projection 103b first comes into contact with the mirror pin 105, and subsequently lifts the mirror pin 105. The quick-return mirror 42 is rotated about the shaft 104 in the counterclockwise direction and reaches its uppermost position.

The quick-return mirror 42 is provided on the rear surface thereof with a sub-mirror 42a. Part of the center of the object light passed through a photographic lens (not shown) is reflected by the sub-mirror 42a to be projected beneath the quick-return mirror 42 towards the AF sensor module 48.

The sub-mirror 42a is retracted to the rear surface of the quick-return mirror 42 when the quick-return mirror 42 is positioned at its uppermost position.

When the rotational axis 60a of the second motor 60 rotates in the forward rotational direction, (i.e., the clockwise direction in FIG. 8), the composite gear 71 rotates in the counterclockwise direction to rotate the sun gear 75a in the clockwise direction. Due to this rotation of the sun gear 75a the rotational arm 75d rotates in the clockwise direction to reach its second position, so that the planet gear 75b, rotating in the counterclockwise direction (as viewed in FIG. 8), is brought into mesh with the pinion 65b fixed on the shaft 65. The rotation of the planet gear 75b in the counterclockwise direction in FIG. 8 is transmitted to the aforementioned spool gear (not shown), formed integral with the film take-up spool 35, through the pinion 65a, the shaft 65, the worm 65b and the reduction gear train 70 as noted above.

Figure 9:
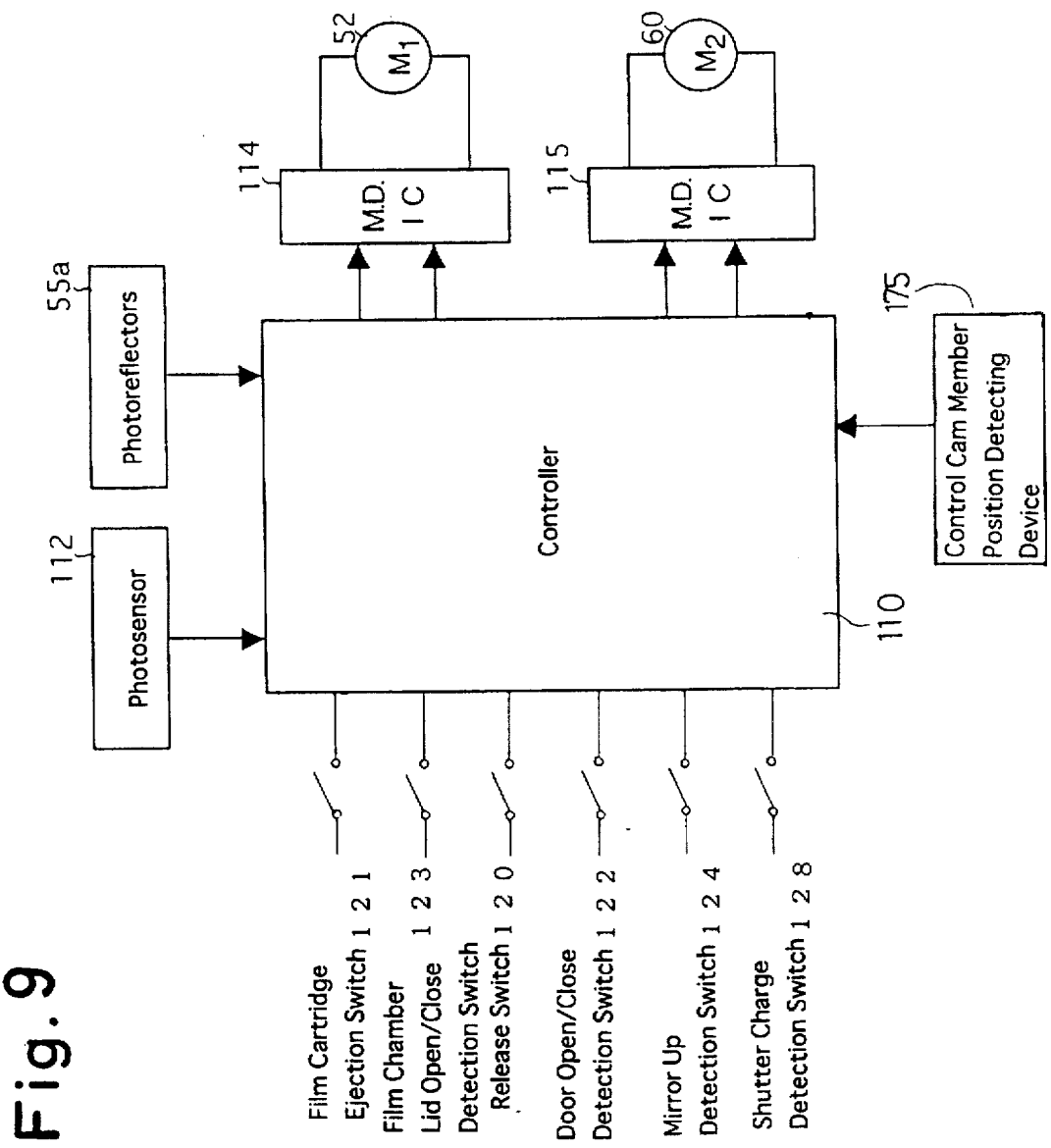
FIG. 9 is an electrical circuit provided in the camera shown in FIG. 7.

An electrical circuit block provided in the camera 30 will be hereinafter discussed with reference to FIG. 9.

The camera 30 is provided with a controller 110, which oversees the overall control of the camera 30. The photosensor 112 and the pair of photoreflectors 55a are electrically connected to the controller 110. The first and second motors 52, 60 are electrically connected to the controller 110 through respective motor drives IC 114, 115.

A release switch 120, a film cartridge ejection switch 121, a door open/close detection switch 122, a film chamber lid open/close detection switch 123, a mirror up detection switch 124, a shutter charge detection switch 128 and the aforementioned control cam member position detecting device 175 are also electrically connected to the controller 110.

The release switch 120 is linked to a release button 119 provided on an upper wall of the camera body 30a, as shown in FIG. 7. The release switch 120 is closed when the release button 119 is fully depressed.

The film cartridge ejection switch 121 is linked to an ejecting button 180 provided at the bottom of the camera body 30a, as shown in FIG. 7. The door open/close detection switch 122 is provided in the vicinity of the film chamber 33. The door open/close detection switch 122 detects whether the openable door 19 of the film cartridge 1 is open or closed.

The film chamber lid open/close detection switch 123 detects whether the film chamber lid (not shown) is open or closed. The mirror up detection switch 124 detects whether or not the quick-return mirror 42 is moved up to its uppermost position. The shutter charge detection switch 128 detects whether or not the shutter charge is completed.

The camera 30 operates according to the flow charts shown in FIGS. 13 through 18.

Figure 13:
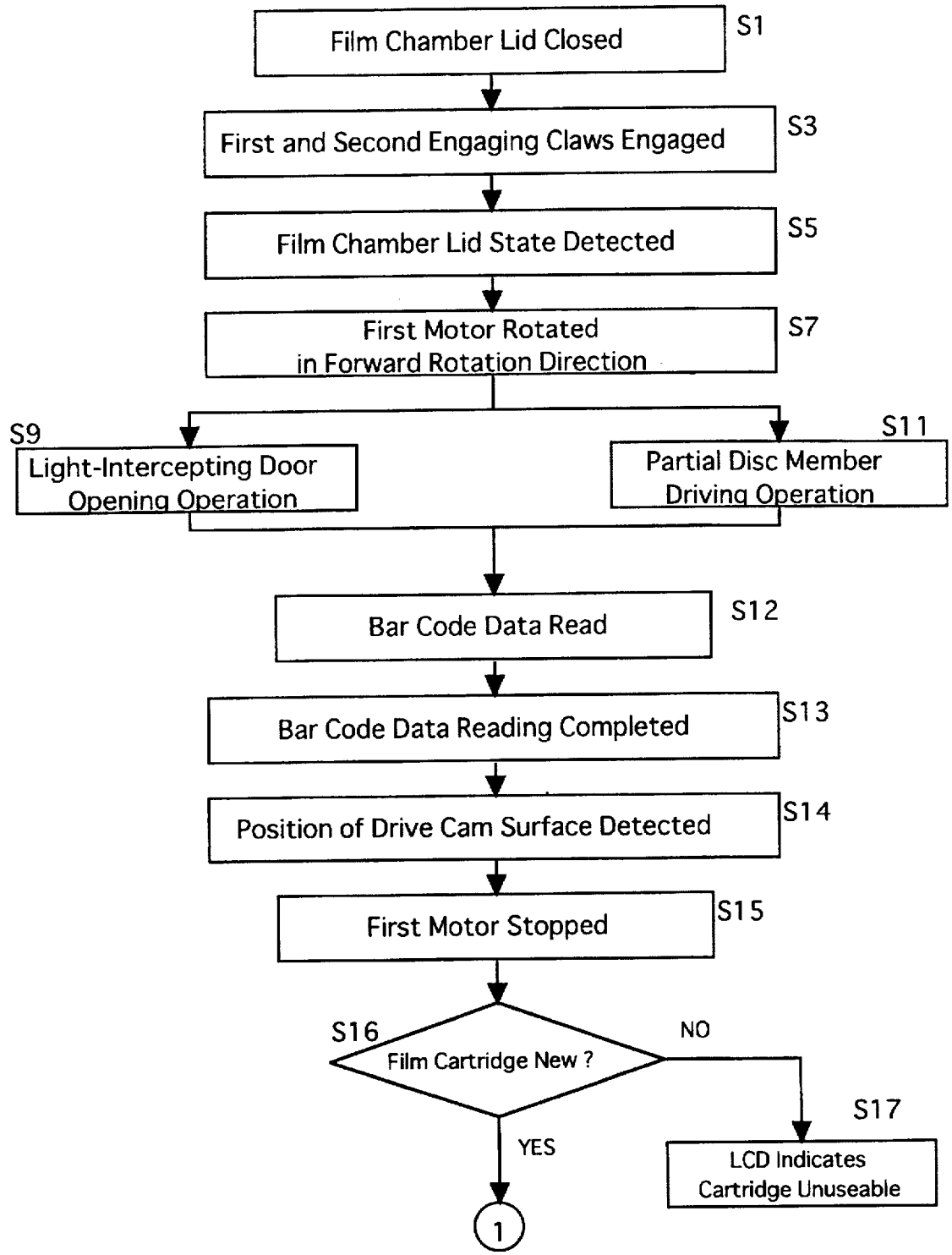
FIGS. 13 through 18 are flow charts illustrating operations of the camera shown in FIG. 7.
Figure 14:
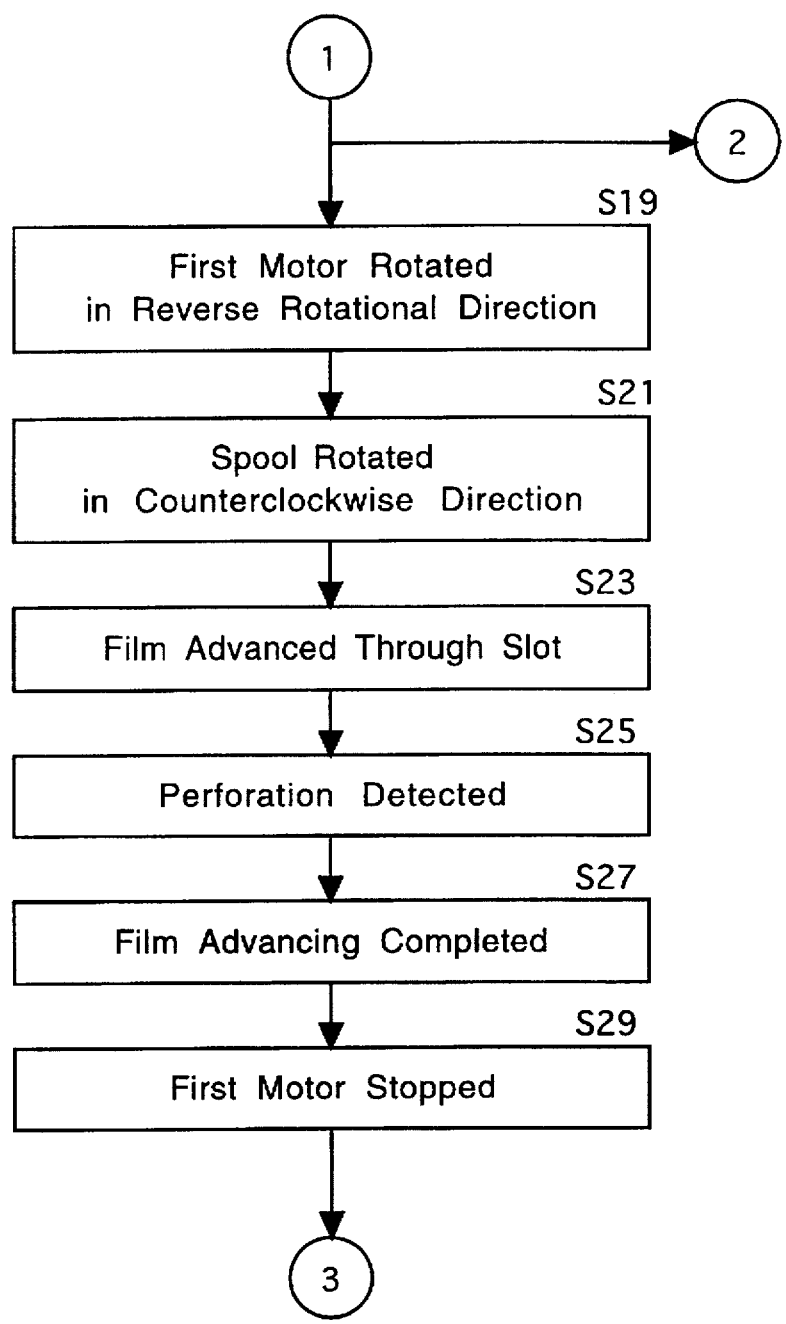
Figure 15:
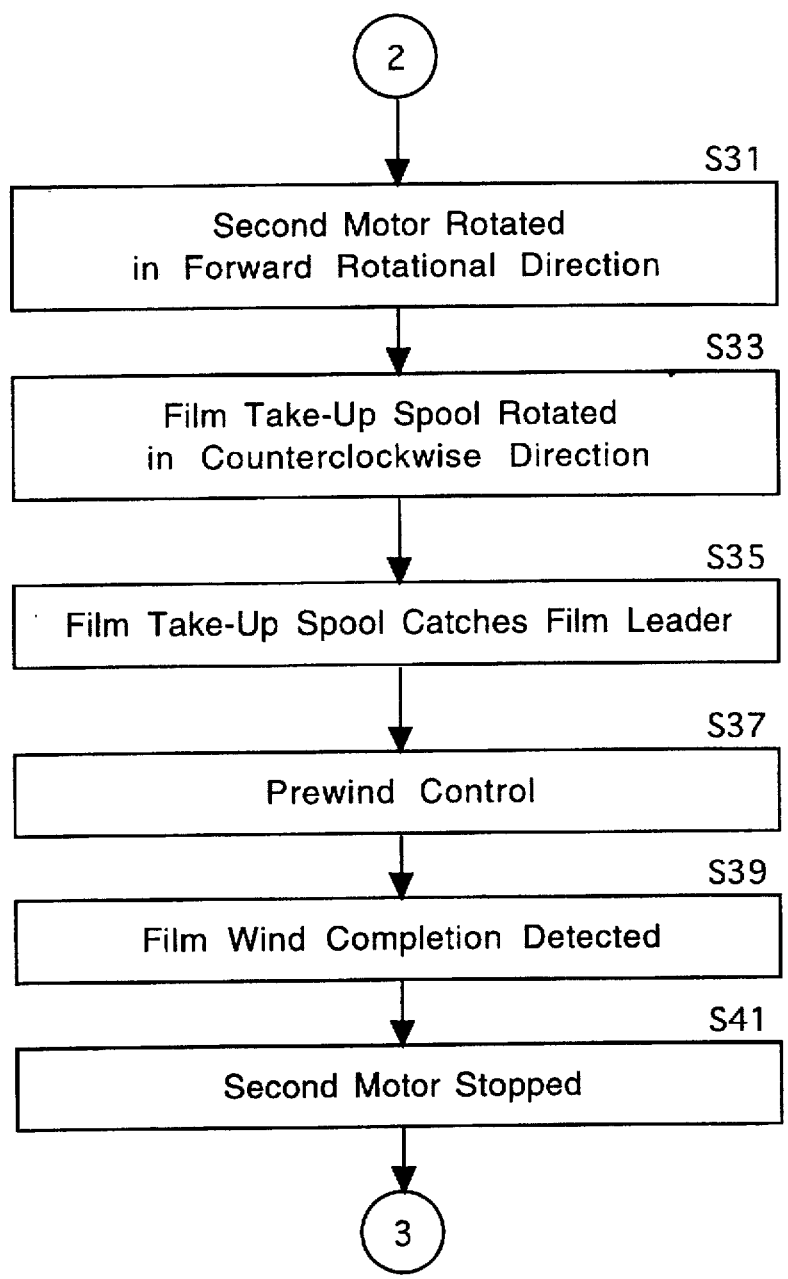
Figure 16:
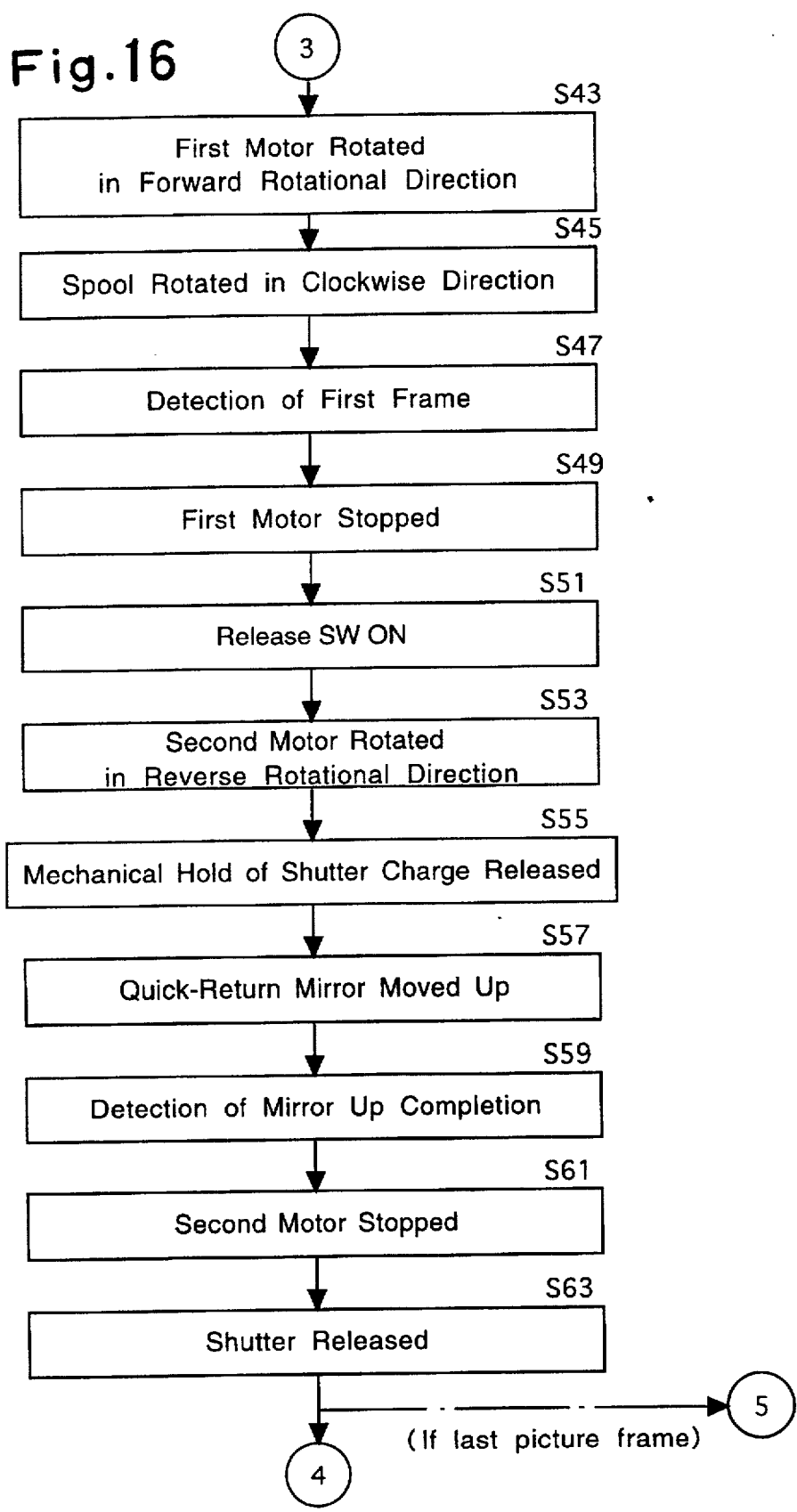
Figure 17:
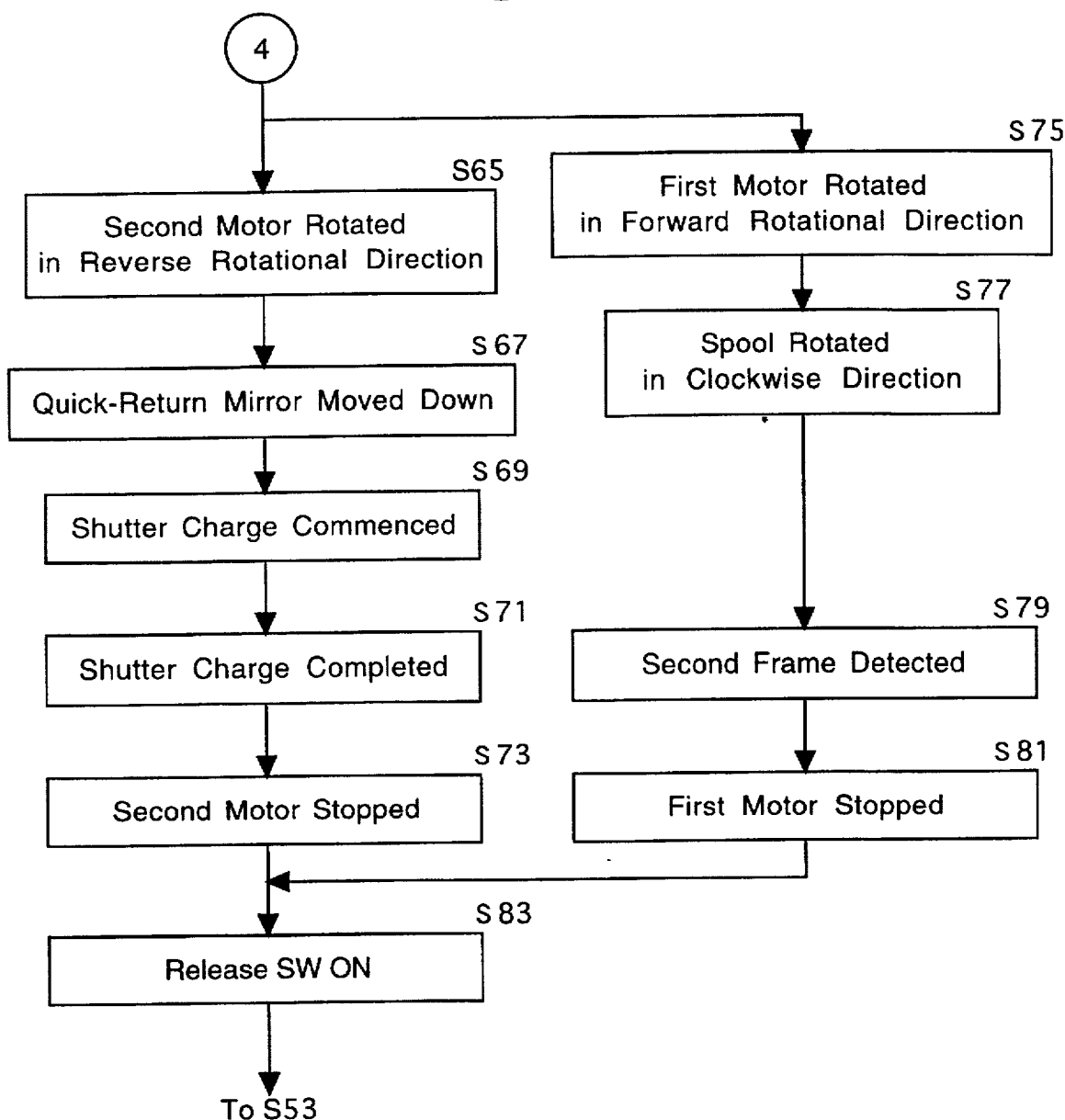
Figure 18:
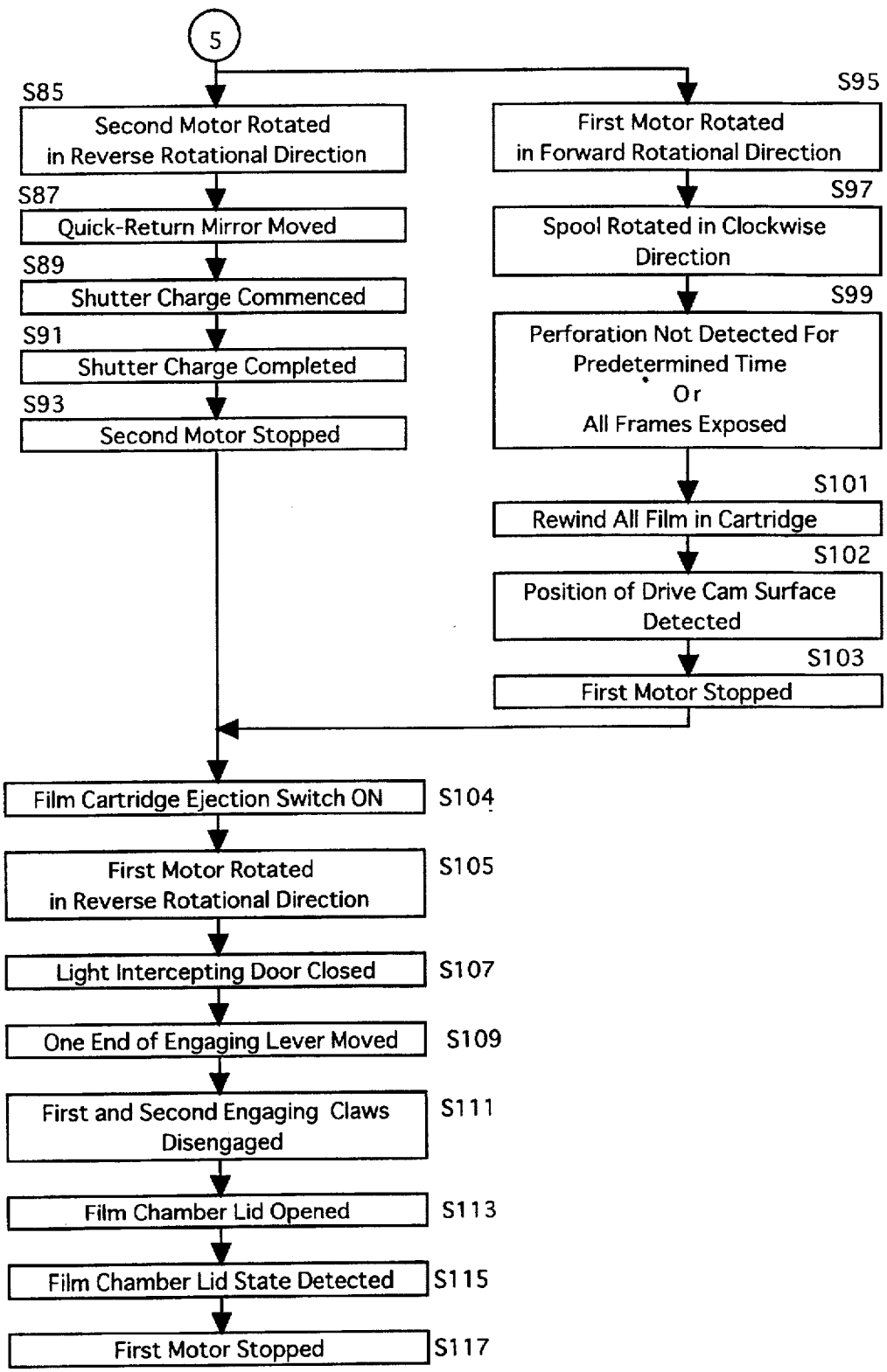

As shown in FIG. 13, in a state where the main switch (not shown) of the camera 30 is ON, if the unexposed film cartridge 1 is inserted into the film chamber 33 in an appropriate manner and the film chamber lid (not shown) for opening or closing the film chamber 33 is subsequently closed (Step S1), the second engaging claw 155 engages with the first engaging claw 151b to lock the film chamber lid (Step S3). Detecting that the film chamber lid is locked through the film chamber lid open/close detection switch 123 (Step S5), the controller 110 actuates the first motor 52 to rotate the rotating shaft 52a in the forward rotational direction through the motor drive IC 114, so as to rotate the sun gear 56a in the counterclockwise direction in FIG. 1. At this stage, the second planet gear 56c is in mesh with the first gear portion 132a of the rotary drive member 130.

Therefore, the second planet gear 56c rotates in the clockwise direction. Due to the rotation of the second planet gear 56c, the rotary drive member 130 rotates in the counterclockwise direction in FIG. 1 through the first gear portion 132a. After the rotary drive member has rotated, from the position shown in FIG. 1 by a predetermined amount in the counterclockwise direction in FIG. 1, the second planet gear 56c disengages from the first gear portion 132a. When disengaging from the first gear portion 132a, the second planet gear 56c does not engage with the second gear portion 132b since the first and second gear portions 132a, 132b are not successive in the vertical direction of the camera 30, as described above.

Figure 2:
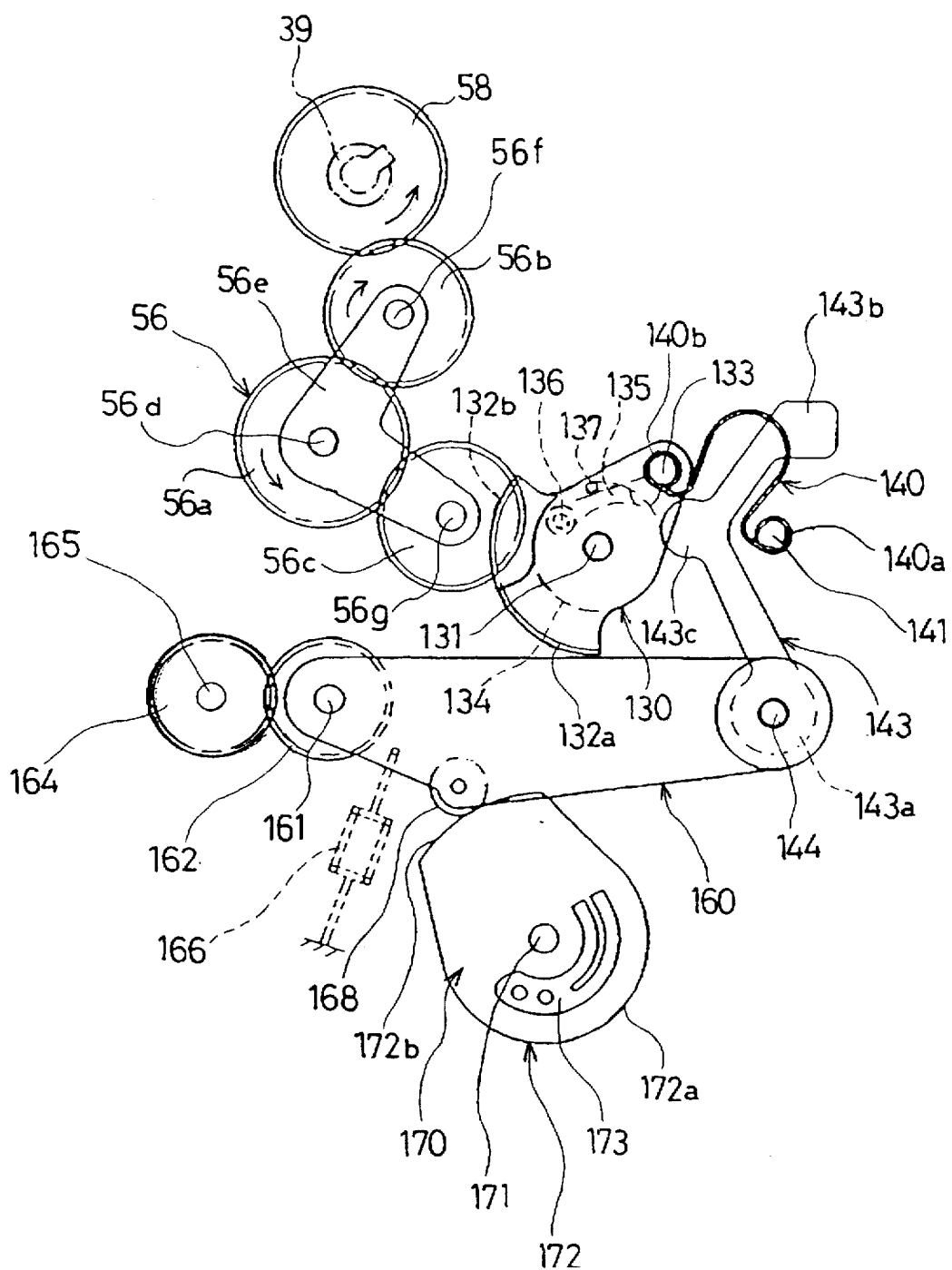
Figure 3:
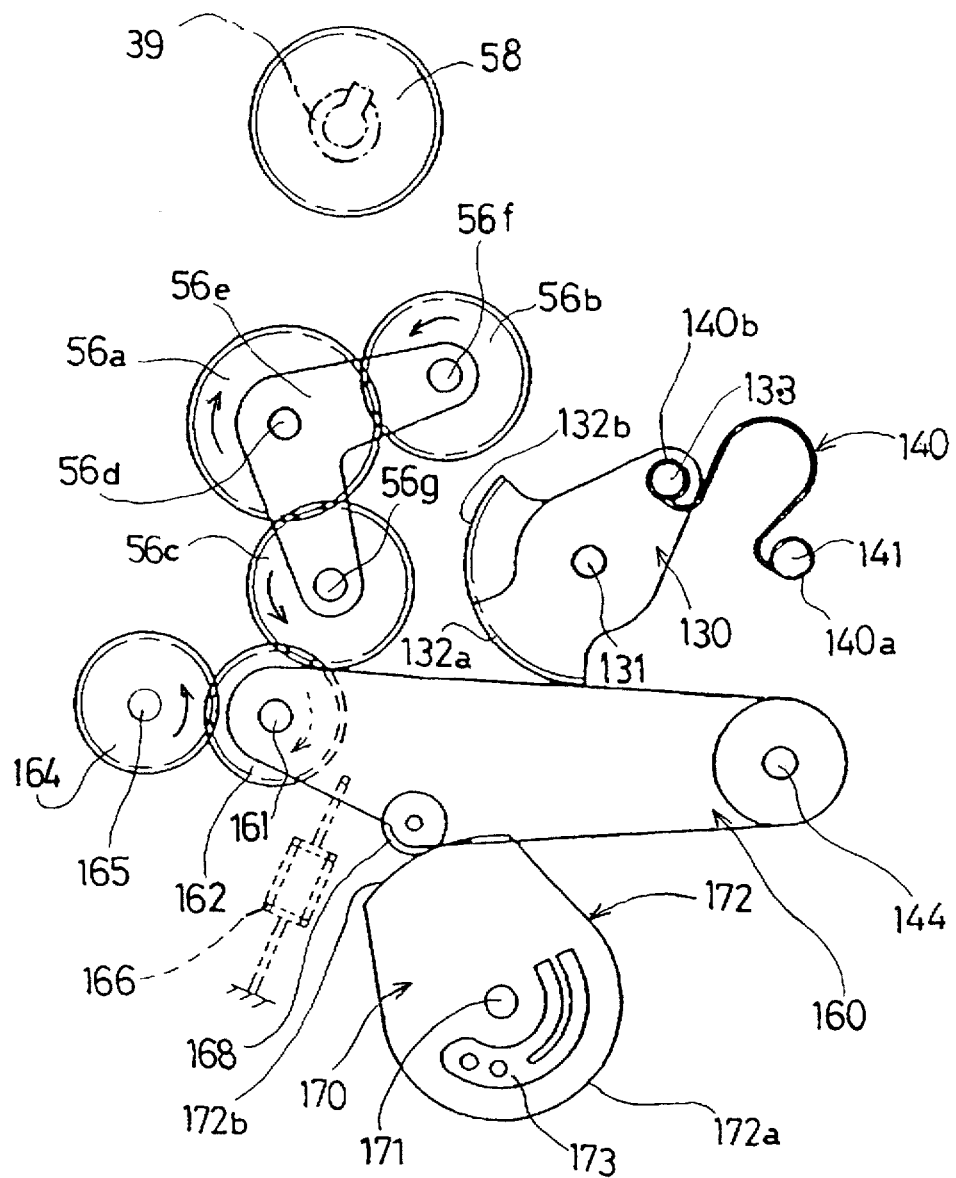

Almost at the same time that the second planet gear 56c disengages from the first gear portion 132a, the rotary drive member 130 further rotates by a predetermined amount in the counterclockwise direction in FIG. 1, due to a snapping-action of the snap spring 140, to fall into the state shown in FIG. 2. The rotation of the rotary drive member 130, from the position shown in FIG. 1 to the position shown in FIG. 2, rotates the door opening/closing key, in the same direction, (the counterclockwise direction), to open the light-intercepting door 19 (Step S9: light-intercepting door opening operation). Furthermore, rotation of the rotary drive member 130 from the position shown in FIG. 1 to the position shown in FIG. 2 slides the free end of the rotational lever 135 along on the engaging projection 143c. The free end of the rotational lever 135 is pressing the engaging projection 143c in approximately the right direction as viewed in FIG. 1, due to the biasing force of the torsion spring (not shown). The torsion spring biases the rotational lever 135 to rotate about the axial pin 136 in the counterclockwise direction in FIG. 1. However, during the slide of the free end of the rotational lever 135 since the biasing force of the coil spring 145 exceeds the biasing force of the aforementioned torsion spring for biasing the rotational lever 135 to rotate, the lock releasing lever 143 does not rotate in the clockwise direction in FIG. 1.

Almost at the same time that the second planet gear 56c disengages from the first gear portion 132a, the first planet gear 56b engages with the drive gear 58, due to the sun gear 56a being rotated in the counterclockwise direction in FIG. 1 by the forward rotation of the first motor 52 at Step S7. Engagement between the first planet gear 56b and the drive gear 38 transmits the rotation of the sun gear 56a to the spool drive gear 39 through the first planet gear 56b and the drive gear 58. This rotates the spool drive gear 39 in the counterclockwise direction as viewed in FIG. 2, which makes the spool 11 rotate in the forward direction to rewind the film in the film cartridge 1 (Step S11: the partial disc member driving operation). Due to this forward rotation of the spool 11, the partial disc member 23 also rotates by a same amount of rotation. During the rotation of the partial disc member 23, the controller 110 reads the information (ISO speed, the number of exposures, etc.) of the bar code 26 from the partial disc member 23 through the photosensor 112 (Step S12). The forward rotation of the spool 11 does not bring the film, housed in the film cartridge 1, out of the film cartridge 1 through the slot 17. The bar-code data reading operation at Step S12 is completed after the spool 11 has rotated in the forward direction by one to two rotations (Step S13).

Immediately after reading the information of the bar code 26, the controller 110 detects the rotational position of the control cam member 170 (which rotates in the clockwise direction by the rotation of the drive gear 58 in the counterclockwise direction in FIG. 1), through the control cam member position detecting device 175. Subsequently, the controller 110 stops the first motor 52 so that the drive cam surface 172b stops at a position where the drive cam surface 172b comes into contact with the roller 168 (Steps S14, S15). The moment the first motor 52 stops, the relay gear 162 is located at its engaging position in mesh with the spool advancing gear 164.

The controller 110 has detected whether the film cartridge 1 is a new cartridge (unexposed) or a used cartridge (exposed or processed) through the photosensor 112 by detecting the initial position of the partial disc member 23 when the spool 11 is forwardly rotated at Step S7. If the film cartridge 1 is a used cartridge, the controller 110 actuates an LCD panel (not shown), provided on the camera 30 at an appropriate position, to visually indicate that the inserted film cartridge 1 is a used cartridge and thus cannot be used. Thereafter, the controller 110 does not carry out the film loading or winding operation (Steps S16 and S17).

If the film cartridge 1 is a new cartridge the controller 110 actuates the first motor 52 to rotate the sun gear 56a in the clockwise direction in FIG. 2 (Steps S16 and S19: film advancing operation). Due to the rotation of the sun gear 56a in the clockwise direction, the second planet gear 56c rotates in the counterclockwise direction in FIG. 2. The rotation of the second planet gear 56c is transmitted to the spool drive fork 39 through the relay gear 162, the spool advancing gear 164, the aforementioned gear train (not shown), the drive gear 58. The spool drive fork 39 is thus rotated in the clockwise direction in FIG. 1. The rotation of the spool drive fork 39 rotates the spool 11 in the film advancing direction, to pull the film housed in the film cartridge 1 of the slot 17 (Step S21). At this time the first planet gear 56b is only in mesh with the sun gear 56a, not with any other gears; thus the first planet gear 56b merely rotates in the counterclockwise direction in FIG. 1, and does not transmit its rotation to any gear.

By the reverse rotation of the spool 11 at Step S21, the film housed in the film cartridge 1 is pulled out of the film cartridge 1 (Step S23). The film is advanced to the spool chamber 31 through a narrow film leading path provided between the pressure plate 55 and the aforementioned aperture frame (not show). Thereafter, the film take-up spool 35 catches the leader of the film and winds the film through the operations at Steps S31 through S37 described below. Thereafter, when the perforation of the film is detected through the pair of photoreflectors 58a, the controller 110 assumes that the leader of the film has been properly engaged with the film take-up spool 35 (i.e., an initial film advancing operation has been completed) and stops the first motor 52 (Steps S25, S27 and S29). Thereafter, control proceeds to Step S43. It should be understood that the operations shown in the flow charts of FIGS. 14 and 15, namely Steps S19 through S29, and Steps S31 through S41 are performed simultaneously.

The controller 110 actuates the second motor 60 to rotate the rotating shaft 60a thereof in the forward rotational direction (in the clockwise direction in FIG. 8). Simultaneously, the rotating shaft 52a of the first motor 52 rotates in the reverse direction for the film advancing operation at Step S19 (Step 31: the film winding operation). The rotation of the rotating shaft 60a in the forward rotational direction is transmitted to the aforementioned spool gear, formed integrally with the film take-up spool 35, to rotate the same through the composite gear 71, the planetary gear 75, the pinion 65a, the shaft 65, the worm 65b and the reduction gear train 70. This rotates the film take-up spool 35 in the film winding direction to wind up the film thereon (Step S33).

When the leader of the film engages with the film take-up spool 35, due to the rotation of the first motor 52 in the operations at Steps S19, S21 and S23, the film take-up spool 35 catches the leader (Step S35) and winds up the film (Step S37: prewind control). Thereafter, when the pair of photo-reflectors 55a detect that the film stops moving (i.e., the film winding operation is completed), the controller 110 stops the second motor 60 (Steps S39 and S41). Thereafter, control proceeds to Step S43.

At Step S39, although the controller 110 detects that the film winding operation is completed through the pair of photoreflectors 55a, the controller 110 may instead detect that the film winding operation is completed through the photosensor 112 by detecting a state in which the partial disc member 23 is not being rotated. Furthermore, after the operation of Step S37, instead of performing the subsequent operations at Steps S39 and S41, the controller 110 may stop the second motor 60 upon detecting, through the pair of photoreflectors 55a, that the film has been wound by a predetermined amount corresponding to all the frames of the film, i.e., the number of exposures of the film. The number of exposures of the film is read as input data at Step S12.

Figure 4:
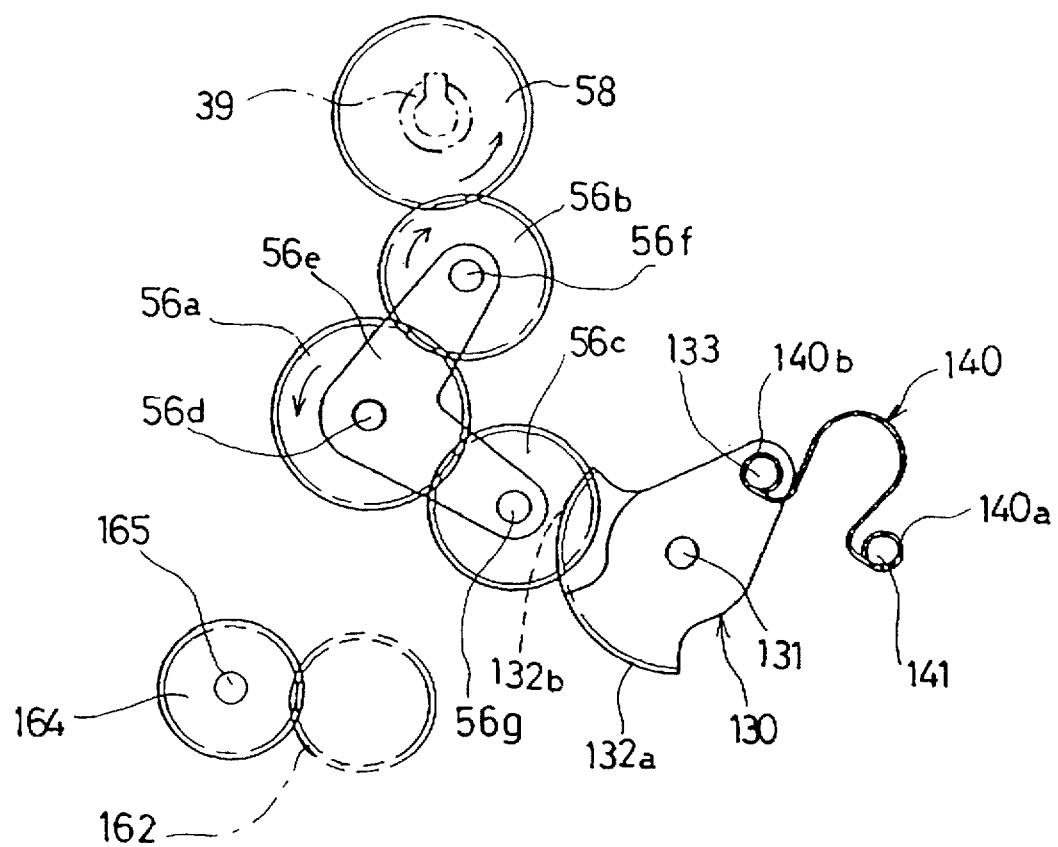

At Step S43, the controller 110 actuates the first motor 52 to rotate the rotating shaft 52a thereof in the forward rotational direction to rewind the film in the film cartridge 1. The spool 11 is thus rotated in the forward rotational direction (Step S45) through the sun gear 56a, the first planet gear 56b, and the drive gear 58. Subsequently, the controller 110 stops the first motor 52 upon detecting, through the pair of photoreflectors 55a, that the first frame of the film is aligned with the photographic aperture (Steps S47 and S49). In this state, the film loading operation of the camera 30 is complete. When the spool 11 rotates at Step S45, the first planet gear 56b meshes with the drive gear 58 as shown in FIG. 4, but the second planet gear 56c does mesh with the second gear portion 132b of the rotary drive member 130 since the second planet gear 56c and the second gear portion 132b are located at different positions in the vertical direction of the camera 30.

After the completion of the film loading operation, if the release button 119 is fully depressed by a photographer, the release switch (SW) 120 is turned ON (Step S51). When the release switch 120 is turned ON the controller 110 actuates the second motor 60 to rotate the rotating shaft 60a thereof in the reverse rotational direction (Step S53). The controller 110 subsequently releases a mechanical hold of the shutter charge in the shutter blade driver 50b while electrically holding the shutter charge so as not to be yet released by means of an electrical magnet (not shown) (Step S55). The reverse rotation of the rotating shaft 60a is transmitted to the mirror drive gear 100 through the output pinion 61, the composite gear 71, the sun gear 75a, the rotational arm 75d, the planet gear 75b, the reduction gear train 80 and the shutter charging gear 90. The mirror drive gear 100 thus rotates in the clockwise direction in FIG. 8 to lift the roller 103d via the mirror drive cam 100c. Thus, the mirror drive lever 103 rotates in the clockwise direction in FIG. 8, which makes the quick-return mirror 42 move up via mirror pin 105 and the engaging projection 103 (Step S57: the quick-return mirror up operation). Upon detecting the completion of the upward movement of the quick-return mirror 42 through the mirror up detection switch 124 (Step S59), the controller 110 stops the second motor 60 (Step S61), and subsequently actuates the shutter blade driver 50b to release the aforementioned electrical hold of the shutter charge, i.e., release the shutter for exposure (Step S63: first frame exposure).

After exposure is completed, the controller 110 again actuates the second motor 60 to rotate the rotating shaft 60a thereof in the reverse direction to move the quick-return mirror 42 down by rotating the mirror drive gear 100 (Steps S65 and S67: the quick-return mirror down operation). Simultaneously, due to the rotation of the shutter charging gear 90, the roller 91e is pushed downwards by the charging cam 90c; thereby the shutter charging lever 91 rotates in the counterclockwise direction in FIG. 8 to perform a shutter charge (Step S69: the shutter charge operation). When the shutter charge is completed, the controller 110 stops the second motor 60 (Steps S71 and S73).

After the exposure is completed at Step S63, the controller 110 actuates the first motor 52 to rotate the rotating shaft 52a thereof in the forward rotational direction (Step S75) to rewind the film in the film cartridge 1 by rotating the spool 11 in the forward rotational direction (Step S77: the film rewinding operation). At the same time, the rotating shaft 60a of the second motor 60 is rotated in the reverse direction at Step S65. Thereafter, the controller 110 stops the first motor 52 upon detecting that the second frame of the film is aligned with the photographic aperture (Steps S79 and S81). Therefore, the second frame of the film is ready to be exposed at Step S81.

Thereafter, the operations from Step S53 to Step S81 are completed each time a picture is taken, i.e., each time the release button 119 is fully depressed, at Step S83. However, if the exposure at Step S63 is for the last frame of the film, control passes to Step S85 are after Step S63.

The operations at Steps S85 through S93 are identical to those at Steps S65 through S73. After the exposure is completed at Step S63, the controller 110 actuates the first motor 52 to rotate the rotating shaft 52a thereof in the forward rotational direction (Step S95) to rewind the film in the film cartridge 1 by rotating the spool 11 in the forward rotational direction (Step S97). At the same time, the rotating shaft 60a of the second motor 60 is rotated in the reverse direction at Step S85.

Thereafter, the controller 110 continues to rotate the rotating shaft 52a of the first motor 52 for a predetermined period of time to rewind all of the film in the film cartridge 1, when no perforation of the film is detected through the pair of reflectors 55a for a predetermined period of time or when all the frees of the film have been exposed (Steps S99 and S101). After rotating the rotating shaft 52a of the first motor 52 for the predetermined period of time, the controller 110 detects the rotational position of the control cam member 170, which rotates due to the rotation of the drive gear 58, through the control cam member position detecting device 175. Subsequently, the controller 110 stops the first motor 52 to step the control cam member 170 at a position where the arc-shaped cam surface 172a comes into contact with roller 168 (Steps S102, S103). At the moment the first motor 52 stops, the relay gear 162 is located at its retracted position, i.e., the position where the relay gear 162 does not mesh with the spool advancing gear 164.

Thereafter, when the ejecting button 180 is manually depressed after the film has been fully rewound in the film cartridge 1, the film cartridge ejection switch 121 is turned ON (Step S104); the controller 110 actuates the first motor 52 to rotate the rotating shaft 52a in the reverse rotational direction (Step S105). Due to this reverse rotation of the first motor 52, the sun gear 56a rotates in the clockwise direction and the first planet gear 56b rotates in the counterclockwise direction in FIG. 4. Subsequently, the first planet gear 56b, which is rotating in the counterclockwise direction in FIG.

Figure 5:
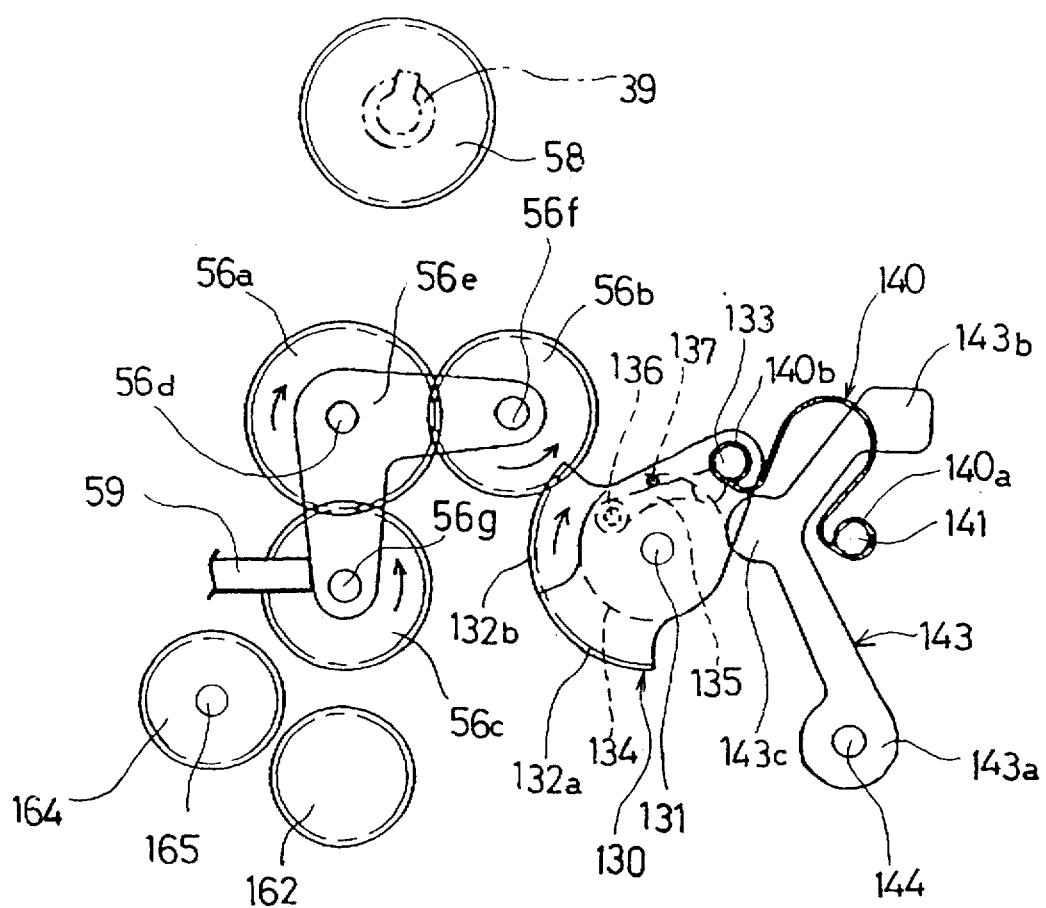

4, engages with the second gear portion 132b of the rotary drive member 130 as shown in FIG. 5. At this time, the second planet gear 56c does not mesh with neither the relay gear 162, that is located at its retracted position, or the spool advancing gear 164, due to the stopper 59 that limits the range of rotation of the arm member 56e. It should be noted that the controller 110 does not actuate the first motor 52 to rotate its rotating shaft 52a in the reverse rotational direction at Step S105 even if the ejecting button 180 is manually depressed at Step S104 if all the film has not yet rewound in the film cartridge 1.

Due to rotation of the first planet gear 56b in the counterclockwise direction in FIG. 5, the rotary drive member 130 rotates in the clockwise direction. Subsequently, the first planet gear 56b disengages from the sector gear 132 after the rotary drive member 130 rotates in the clockwise direction by a predetermined amount from the state shown in FIG. 5, since the first planet gear 56b engages with the second gear portion 132b but not with the first gear portion 132a.

Almost at the same time that the first planet gear 56b disengages from the second gear portion 132b, the rotary drive member 130 further rotates in the clockwise direction in FIG. 5 by a predetermined amount due to a snapping-action of the snap spring 140, to thereby fall into the state shown in FIG. 6. Rotation of the rotary drive member 130 from the position shown in FIG. 5 to the position shown in FIG. 6 rotates the door opening/closing key, coaxially formed integral with the rotational shaft 131, in the same direction (the clockwise direction in FIG. 5), to thereby close the light-intercepting door 19 (Step S107: light-intercepting door closing operation). Furthermore, rotation of the rotary drive member 130 from the position shown in FIG. 5 to the position shown in FIG. 6 slides the free end of the rotational lever 135 along the engaging projection 143c while the free end of the rotational lever 135 presses the engaging projection 143c in the approximate right direction as viewed in FIG. 5 through the biasing force of the aforementioned torsion spring (not shown). This biases the rotational lever 135 to rotate about the axial pin 136 in the counterclockwise direction. Since the projection 137 restricts the rotational lever 135 to rotate in the counter-clockwise direction in FIG. 5, the free end of the rotational lever 135 presses the engaging projection 143c in the approximate right direction as viewed in FIG. 5 against the biasing force of the coil spring 145. As such, the lock releasing lever 143 rotates by a small amount in the clockwise direction in FIG. 5, as shown by a phantom line in FIG. 6. The small amount of rotation of the lock releasing lever 143 in the clockwise direction in FIG. 5 or 6 moves one end 151a of the engaging lever 151 in approximately the right direction as viewed in FIG. 6, as shown by a phantom line in FIG. 6 (Step S109). Thereby the first engaging claw 151b disengages from the second engaging claw 155 (Step S111), so that the film chamber lid (not shown) automatically opens due to the aforementioned biasing member (not shown) (Step S113). The controller 110 stops the first motor 52 upon detecting the opening of the film chamber lid through the film chamber lid open/close direction switch 123 (Steps S115 and S117). In this state the film cartridge 1 can be removed from the film chamber 33.

Although the camera 30 in the above described embodiment utilizes a prewind control, it may instead utilize a regular wind control. In such a case, the film is wound by one picture frame each time a picture is taken. All of the film is rewound in the film cartridge 1 when all the frames of the film have been exposed.

Although the film cartridge used in the camera 30 is the specific type of film cartridge disclosed in U.S. Pat. No. 5,122,820 or U.S. Pat. No. 5,296,887, the present invention may be applied to any other camera using another type of film cartridge.

Although the present invention is directed to the SLR camera 30 in the above embodiment, the present invention may be directed to a lens-shutter type camera.

As can be seen from the foregoing, according to the camera 30 to which the present invention is applied, the film winding/rewinding, shutter charge and quick-return mirror up/down operations, which are all to be performed in the camera 30, are efficiently and effectively allocated to only two motors, i.e., the first and second motors 52 and 60. Furthermore, the first motor 52 is also responsible for the light-intercepting door opening/closing operations, thus realizing a small and compact camera. At the same time, jamming of the film between the light-intercepting door and the slot due to closing the light-intercepting door while some film remains outside the film cartridge can be prevented from occurring.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera which uses a film cartridge, said film cartridge including:
   a casing having a first spool therein;
   a slot formed on said casing, a film being drawn from or returned into said casing through said slot;
   a light-intercepting door provided along said slot for opening and closing said slot; and
   a pivotal shaft for rotatably mounting said light-intercepting door on said casing,
   said camera comprising:
   a first motor which opens and closes said door by rotating said pivotal shaft, performs a film advancing operation, in which said first motor rotates said first spool in a direction to advance said film wound on said first spool from said film cartridge, and a performs film rewinding operation, in which said first motor rotates said first spool in another direction to rewind said film into said film cartridge;
   a second motor which performs a film winding operation, in which said second motor rotates a second spool provided in said camera to wind said film around said second spool;
   a reduction gear train provided between said first motor and said pivotal shaft to transmit rotation of a rotating shaft of said first motor to said pivotal shaft while reducing a rotational speed of said pivotal shaft with respect to said rotating shaft of said first motor; and
   a planetary gear positioned between said reduction gear train and said pivotal shaft, said planetary gear including a sun gear and first and second planet gears each engaging with, and revolving around, said sun gear while maintaining a distance therebetween.

2. The camera according to claim 1, wherein said first motor opens said door or performs said film rewinding operation by rotating a rotating shaft of said first motor in a first direction, and wherein said first motor closes said door or performs said film advancing operation by rotating said rotating shaft of said first motor in a second direction.

3. The camera according to claim 2, wherein said film cartridge further includes a rotational member which rotates together with said spool, said first rotational member being provided with a bar code, and wherein said first motor further performs a rotating member driving operation, in which said first motor rotates said rotational member by rotating said first spool to read information from said bar code.

4. The camera according to claim 2, further comprising:
   a film chamber lid for opening and closing an opening formed on said camera, through which said film cartridge is inserted into and removed from a film chamber of said camera;
   a lock mechanism for locking said film chamber lid when said film chamber lid is closed; and
   a lock releasing mechanism for unlocking said lock mechanism to open said film chamber lid through rotation of said first motor when closing said door.

5. The camera according to claim 1, further comprising a rotary drive member coaxially fixed to said pivotal shaft, wherein said rotary drive member comprises a sector gear including a first gear portion and a second gear portion successively formed along a peripheral edge of said rotary drive member, and wherein said first gear portion can mesh with said first planet gear but cannot mesh with said second planet gear, and said second gear portion can mesh with said second planet gear but cannot mesh with said first planet gear.

6. The camera according to claim 5, wherein said rotary drive member is biased by a snap spring in one rotational direction.

7. The camera according to claim 1, wherein said camera is an SLR camera, and wherein said second motor further performs a shutter charging operation, in which a shutter charge is performed, a mirror up operation, in which a quick-return mirror provided in said SLR camera is moved up after a shutter release, and a mirror down operation, in which said quick-return mirror is moved down after said mirror up operation is completed.

8. The camera according to claim 7, wherein said first motor opens said door or performs said film rewinding operation by rotating a rotating shaft of said first motor in a first direction, and wherein said first motor closes said door or performs said film advancing operation by rotating said rotating shaft of said first motor in a second direction.

9. The camera according to claim 8,
   wherein said second motor performs said shutter charging operation, said mirror up operation and said mirror down operation by rotating a rotating shaft of said second motor in a first rotational direction, and
   wherein said second motor performs said film winding operation by rotating said rotating shaft of said second motor in a second rotational direction.

* * * * *